US012789263B2

(12) United States Patent
Ejderklint et al.

(10) Patent No.: US 12,789,263 B2
(45) Date of Patent: Nov. 10, 2026

(54) DOUBLE-SIDED TANGENTIAL CUTTING INSERT

(71) Applicant: SECO TOOLS AB, Fagersta (SE)

(72) Inventors: Christer Ejderklint, Fagersta (SE); Benjamin Michelet, Fagersta (SE)

(73) Assignee: Seco Tools AB, Fagersta (SE)

( * ) Notice: Subject to any disclaimer, the term of this patent is extended or adjusted under 35 U.S.C. 154(b) by 265 days.

(21) Appl. No.: 18/719,407

(22) PCT Filed: Dec. 13, 2022

(86) PCT No.: PCT/EP2022/085518
§ 371 (c)(1),
(2) Date: Jun. 13, 2024

(87) PCT Pub. No.: WO2023/110814
PCT Pub. Date: Jun. 22, 2023

(65) Prior Publication Data

US 2025/0050428 A1 Feb. 13, 2025

(30) Foreign Application Priority Data

Dec. 17, 2021 (EP) .................................... 21315281

(51) Int. Cl.
*B23B 27/16* (2006.01)
*B23C 5/20* (2006.01)

(52) U.S. Cl.
CPC ... *B23B 27/1611* (2013.01); *B23B 2200/0485* (2013.01); *B23B 2200/369* (2013.01); *B23C 5/202* (2013.01)

(58) Field of Classification Search
CPC ......... B23B 27/1611; B23B 2200/0485; B23B 2200/369; B23C 2200/0494;
(Continued)

(56) References Cited

U.S. PATENT DOCUMENTS 4,294,566 A * 10/1981 Boone ................ B23B 27/1622 407/104
6,227,772 B1 5/2001 Heinloth et al.
(Continued)

FOREIGN PATENT DOCUMENTS

EP 2214857 B1 10/2011
EP 2507003 B1 12/2014
(Continued)

*Primary Examiner* — Sara Addisu
(74) *Attorney, Agent, or Firm* — Corinne R. Gorski

(57) ABSTRACT

A double-sided tangential cutting insert, having eight different working positions, includes two opposite end faces serving as leading and trailing faces of the cutting insert, two opposite major side faces, two opposite minor side faces, a through hole extending between the two major side faces, cutting edges distributed along a periphery of each end face, and four abutment surfaces arranged on each end face in a grid-like pattern with two first arrays, each of which have two consecutive abutment surfaces that extend between the two major side faces, and two second arrays, each of which have two consecutive abutment surfaces and extend between the two minor side faces. Each abutment surface are inclined inwards in the cutting insert such that each two consecutive abutment surfaces in each array are inclined towards each other.

21 Claims, 13 Drawing Sheets

(58) Field of Classification Search
CPC ............ B23C 5/2213; B23C 2200/085; B23C 2200/086; B23C 2200/367; B23C 5/08; B23C 2210/168; B23C 5/202; B23C 2200/125
See application file for complete search history.

(56) References Cited

U.S. PATENT DOCUMENTS

| | | | | |
|---|---|---|---|---|
| 7,094,007 | B2 * | 8/2006 | Satran | B23C 5/06 407/42 |
| 8,282,320 | B2 * | 10/2012 | Hartlohner | B23B 27/1618 407/113 |
| 9,205,499 | B2 * | 12/2015 | Morrison | B23C 5/06 |
| 9,981,323 | B2 * | 5/2018 | Fang | B23C 5/2213 |
| 10,086,447 | B2 * | 10/2018 | Nam | B23C 5/06 |
| 10,259,055 | B2 * | 4/2019 | Choi | B23C 5/2226 |
| 10,421,134 | B2 * | 9/2019 | Brunetto | B23C 5/06 |
| 10,682,713 | B2 * | 6/2020 | Jansson | B23C 5/2213 |
| 11,772,167 | B2 * | 10/2023 | Shiroma | B23B 27/1611 407/53 |
| 2004/0013478 | A1 * | 1/2004 | Dehn | B23C 5/2213 407/113 |
| 2007/0104546 | A1 | 5/2007 | Maeta et al. | |
| 2011/0129309 | A1 * | 6/2011 | Kovac | B23C 5/2213 407/103 |
| 2011/0164932 | A1 | 7/2011 | Choi et al. | |
| 2013/0216319 | A1 * | 8/2013 | Michelet | B23C 5/2208 407/33 |
| 2016/0167137 | A1 * | 6/2016 | Agic | B23B 27/1662 407/66 |
| 2022/0250174 | A1 * | 8/2022 | Shiroma | B23C 5/109 |

FOREIGN PATENT DOCUMENTS

| | | | |
|---|---|---|---|
| WO | 97/17157 | A1 | 5/1997 |
| WO | 2012/59395 | A1 | 5/2012 |

* cited by examiner

DOUBLE-SIDED TANGENTIAL CUTTING INSERT

RELATED APPLICATION DATA

This application is a § 371 National Stage Application of PCT International Application No. PCT/EP2022/085518 filed Dec. 13, 2022 with priority to EP Application Serial No. 21315281.2, filed Dec. 17, 2021.

FIELD OF THE INVENTION AND PRIOR ART

The present invention relates to a double-sided tangential cutting insert according to the preamble of claim 1 with eight different working positions. The invention also relates to a tool comprising such a double-sided tangential cutting insert.

A cutting tool in the form of a milling or turning tool may be provided with one or more cutting inserts detachably mounted in a respective insert seat in a tool body of the cutting tool. Each individual cutting insert may be provided with different sets of cutting edges, to thereby allow each cutting insert to be turned into different working positions. When a cutting edge of a set of cutting edges has been worn out, the cutting insert may be repositioned in its insert seat and mounted in a new working position with another set of cutting edges in an active cutting position.

A tangential cutting insert may also be referred to as an on-edge cutting insert and is fixed to a tool body by means of a fastening element in the form of a screw that extends through a through hole in the cutting insert and is engaged in a screw hole in a support surface in an insert seat in the tool body, wherein the through hole in the cutting insert extends through two opposite faces of the cutting insert that lack rake surfaces. Thus, in a tangential cutting insert, the through hole for the fastening element does not extend through any of the faces of the cutting insert that are provided with surfaces intended to serve as rake surfaces. Furthermore, a tangential cutting insert is mounted in an insert seat in a tool body where the screw hole for the fastening element is provided in a radial or axial support surface in the insert seat and not in a tangential support surface in the insert seat, which implies that said screw hole extends in the radial or axial direction of the tool body, or somewhat obliquely to the radial or axial direction, and not in the tangential direction of the tool body.

A double-sided tangential cutting insert with eight different working positions has four different working positions on each one of two opposite end faces of the cutting insert that are configured to serve as leading and trailing faces of the cutting insert when mounted to a tool body and as seen in an intended direction of rotation of the tool body, which implies that the cutting insert has four sets of cutting edges located along the periphery of a first end face and four other sets of cutting edges located along the periphery of an opposite second end face. This type of tangential cutting insert may be used in four different working positions, two on each end face, when mounted in an insert seat having the screw hole for the fastening element provided in a radial support surface in the insert seat and in four other working positions, two on each end face, when mounted in an insert seat having the screw hole for the fastening element provided in an axial support surface in the insert seat.

Double-sided tangential cutting inserts are previously known in various configurations and examples of such cutting inserts are for instance disclosed in WO 97/17157 A1, WO 2012/59395 A1, EP 2 507 003 B1 and EP 2 214 857 B1.

OBJECT OF THE INVENTION

The object of the present invention is to provide a double-sided tangential cutting insert of the above-mentioned type that has a new and favourable design.

SUMMARY OF THE INVENTION

According to the invention, said object is achieved by means of a double-sided tangential cutting insert having the features defined in claim 1.

The double-sided tangential cutting insert according to the invention is turnable into eight different working positions and comprises:

- two end faces arranged opposite to each other on opposite sides of the cutting insert, wherein the two end faces are configured to serve as leading and trailing faces of the cutting insert when mounted to a tool body and as seen in an intended direction of rotation of the tool body;
- a peripheral surface extending around the cutting insert between the two end faces, the peripheral surface comprising:
  - two major side faces arranged opposite to each other on opposite sides of the cutting insert,
  - two minor side faces arranged opposite to each other on opposite sides of the cutting insert, each one of the two minor side faces being arranged between the two major side faces, and
  - four corner side faces, each of which being arranged between a major side face and a minor side face;
- a through hole extending through the cutting insert between the two major side faces;
- a first group of cutting edges distributed along a periphery of a first end face of the two end faces and formed at an intersection between the first end face and the peripheral surface;
- a second group of cutting edges distributed along a periphery of a second end face of the two end faces and formed at an intersection between the second end face and the peripheral surface;
- a first group of abutment surfaces provided on the first end face; and
- a second group of abutment surfaces provided on the second end face.

When the cutting insert is mounted to a tool body in a position with the first end face serving as leading face of the cutting insert and the second end face serving as trailing end of the cutting insert, a surface on the first end face will serve as rake surface of the cutting insert and one or more surfaces on the opposite second end face will serve as tangential abutment surfaces of the cutting insert. When the cutting insert is mounted to a tool body in a position with the second end face serving as leading face of the cutting insert and the first end face serving as trailing end of the cutting insert, a surface on the second end face will serve as rake surface of the cutting insert and one or more surfaces on the opposite first end face will serve as tangential abutment surfaces of the cutting insert. Preferably, the two minor side faces are parallel with each other as seen in a cross-sectional planes through the cutting insert perpendicularly to a centre axis of the through hole. Preferably, the two end faces have 180° rotational symmetry with each other with respect to the centre axis of the through hole. Preferably, the two end faces are mirror symmetrical to each other with respect to a symmetry plane that contains the centre axis of the through hole and extends halfway between the two end faces.

According to the invention, each one of the first and the second group of abutment surfaces comprises four plane, or at least substantially plane, i.e plane within manufacturing tolerances, abutment surfaces arranged on the associated end face in a grid-like pattern with two first arrays, each of which comprising two consecutive abutment surfaces and extending between the two major side faces, and two second arrays, each of which comprising two consecutive abutment surfaces and extending between the two minor side faces, wherein the four abutment surfaces on each one of the two end faces are separated from each other by a transition area. Each abutment surface in each one of the first and the second group of abutment surfaces is inclined inwards in the cutting insert as seen in a direction from a first edge of the abutment surface facing the adjacent major side face towards an opposite second edge of the abutment surface facing the other abutment surface in the same first array and also inclined inwards in the cutting insert as seen in a direction from a third edge of the abutment surface facing the adjacent minor side face towards an opposite fourth edge of the abutment surface facing the other abutment surface in the same second array, such that each two consecutive abutment surfaces in each array of the two first arrays are inclined towards each other and such that each two consecutive abutment surfaces in each array of the two second arrays are inclined towards each other.

When the cutting insert is mounted in an insert seat in a tool body in a working position with one or more of the cutting edges in the first group of cutting edge serving as active cutting edges, one or more of the inclined abutment surfaces in the second group of abutment surfaces on the second end face will be serving as tangential abutment surfaces and abut against corresponding tangential support surfaces in the insert seat. When the cutting insert is mounted in an insert seat in a tool body in a working position with one or more of the cutting edges in the second group of cutting edge serving as active cutting edges, one or more of the inclined abutment surfaces in the first group of abutment surfaces on the second end face will be serving as tangential abutment surfaces and abut against corresponding tangential support surfaces in the insert seat. The specific arrangement of the four abutment surfaces in each one of the first and second group of abutment surfaces in a grid-like pattern with each abutment surface inclined towards the adjacent abutment surface in the same first array and inclined also towards the adjacent abutment surface in the same second array implies that the four abutment surfaces in each one of the first and the second group of abutment surfaces are arranged in a sort of double V-shape, which in its turn makes it possible to achieve a strong and reliable locking of the cutting insert in an insert seat of a tool body when two or more of the abutment surfaces in the same group of abutment surfaces are configured to simultaneously serve as tangential abutment surfaces and abut against corresponding tangential support surfaces in the insert seat. A particularly strong and reliable locking of the cutting insert in an insert seat of a tool body is achieved when two abutment surfaces located diagonally opposite each other on the same end face are configured to simultaneously serve as tangential abutment surfaces and abut against corresponding tangential support surfaces in the insert seat. That two abutment surface are located diagonally opposite each other here implies that these two abutment surfaces are included in the same group of abutment surfaces but not included in the same first array or in the same second array.

The four inclined abutment surfaces on one and the same end face may be configured to jointly serve as tangential abutment surfaces of the cutting insert in some of the possible working positions of the cutting insert. However, the four inclined abutment surfaces on one and the same end face may as an alternative be configured to serve as abutment surfaces of the cutting insert one at a time or two at a time or three at a time in different working positions of the cutting insert.

The arrangement of the four inclined abutment surfaces described above, makes the cutting insert versatile because it may be mounted in different insert seats at different positions in the cutting tool where the cutting insert is subject to different cutting force directions and loads. Depending on the direction of the cutting forces, the insert seat may have different arrangements and different positions of the tangential support surfaces to better absorb the cutting forces, and the cutting insert according to the invention offers many possibilities to arrange the tangential support surfaces in the insert seat in a favourable manner. The described double V-shape of the abutment surfaces will also make it possible to simplify the manufacturing of the insert seat in some cases, for example when the accessibility in the manufacture of the insert seat is limited because of the position of the insert seat in the tool body, since the described double V-shape provides a good stability of the cutting insert also when only one or two or three of the inclined abutment surfaces serve as abutment surfaces at a time.

An embodiment of the invention is characterized in:

that the two minor side faces are parallel with each other as seen in cross-sectional planes through the cutting insert perpendicularly to the centre axis of the through hole;

that an imaginary projection plane that contains the centre axis of the through hole extends perpendicularly to the two minor side faces;

that an orthographic parallel projection of the four abutment surfaces in the first group of abutment surfaces onto the projection plane has a total projected area $A_{A1}$;

that an orthographic parallel projection of the four abutment surfaces in the second group of abutment surfaces onto the projection plane has a total projected area $A_{A2}$;

that an orthographic parallel projection of the transition area between the four abutment surfaces in the first group of abutment surfaces onto the projection plane has a projected area $A_{T1}$;

that an orthographic parallel projection of the transition area between the four abutment surfaces in the second group of abutment surfaces onto the projection plane has a projected area $A_{T2}$; and that each one of the quotients $A_{T1}/A_{A1}$ and $A_{T2}/A_{A2}$ is smaller than or equal to 1, preferably smaller than or equal to 0.85, more preferably smaller than or equal to 0.5 and most preferably smaller than or equal to 0.3.

When the above-mentioned quotients are larger than 1, there is a risk of instability due to rather small size of the abutment surfaces. When the quotients are close below or equal to 1, the abutment surfaces are sufficiently large to provide good stability of the cutting insert in the associated insert seat at the same time as the four abutment surfaces in each group, due to the rather large transition areas, are sufficiently spaced apart from each other to reduce the risk for chip erosion of the abutment surfaces on the end face presently serving as leading face of the cutting insert. The chips formed by the active cutting edges on the last-mentioned end face may move along the abutment surface adjacent to the active cutting edges and may hit one or more of the other three abutment surfaces in the same group of abutment surfaces and cause erosion thereof. The risk of such chip erosion is reduced with an increase of the distance between the abutment surfaces. When the above-mentioned quotients are close below or equal to 0.85, there is a good balance between stability and risk of chip erosion. When the quotients are close below or equal to 0.5, there is a good balance between the size of the abutment surfaces and the stresses occurring at the transition between two adjacent abutment surfaces. When the quotients are smaller than or equal to 0.3, the size of the abutments surfaces is so large that it will be possible to reduce the number of abutment surfaces that needs to be used as active abutment surfaces at a time in each individual working position. The projected areas $A_{T2}$ and $A_{T2}$ may be very small but in all cases, the quotients $A_{T1}/A_{A1}$ and $A_{T2}/A_{A2}$ are larger than 0 (zero).

According to another embodiment of the invention, the two minor side faces are parallel with each other as seen in cross-sectional planes through the cutting insert perpendicularly to the centre axis of the through hole, wherein at least a part of each one of the four abutment surfaces on each one of the two end faces is located at a longer distance from an imaginary reference plane that contains the centre axis of the through hole and extends perpendicularly to the two minor side faces than each part of the transition area on the same end face. Thus, in this case, the transition area on each one of the first and the second end face is in its entirety located at a lower level than the highest part of each one of the four abutment surfaces on the same end face, i.e. below an imaginary plane drawn through the highest point on each one of the four abutment surfaces on the same end face.

That the two minor side faces are parallel with each other as seen in cross-sectional planes through the cutting insert perpendicularly to the centre axis of the through hole implies that the minor side faces extend in parallel with each other between the two end faces as seen in every cross-sectional plane through the cutting insert that is perpendicular to the centre axis of the through hole and intersects the two end faces.

According to another embodiment of the invention, the transition area on each one of the two end faces has a concave cross-sectional shape, which implies that no part of the transition area forms a protrusion on the associated end face between any of the abutment surfaces on the end face. Hereby, the transition area on an end face does not constitute any protruding obstruction when the cutting insert is mounted in an insert seat with the end face facing the tangential support surface or surfaces in the insert seat, which makes it easier to adapt the insert seat to the cutting insert. The transition area on each one of the two end faces is preferably formed by a first groove extending on the associated end face between the two first arrays of abutment surfaces and an intersecting second groove extending on the associated end face between the two second arrays of abutment surfaces. In the latter case, the transition area on each one of the two end faces is formed as recesses in the associated end face. This ensures a safer positioning of the cutting insert in the insert seat and facilitates manufacturing of the insert seat. This also ensures that a transition between the tangential support surfaces in the insert seat will not collide with the cutting insert and cause inappropriate positioning of the cutting insert in the insert seat also when the insert seat is manufactured with wider tolerances.

According to a further one embodiment of the invention, the transition area on each one of the two end faces is formed by a first smooth concave transition which is tangentially connected to each of the four abutment surfaces, and an intersecting second smooth concave transition which is also tangentially connected to each of the four abutment surfaces.

According to another embodiment of the invention, the first end face is divided into four sections by an imaginary first dividing plane, which extends between and separates the two first arrays of abutment surfaces on the first end face and preferably contains the centre axis of the through hole, and an imaginary second dividing plane, which is transversal to and preferably perpendicular to the first dividing plane and extends between and separates the two second arrays of abutment surfaces on the first end face, wherein:

the two end faces have 180° rotational symmetry with each other with respect to the centre axis of the through hole, or the two end faces are mirror symmetrical to each other with respect to a symmetry plane that contains the centre axis of the through hole and extends halfway between the two end faces.

When the first end face is divided into four sections by the above-mentioned first dividing plane and second dividing plane, the transition area between the two first arrays of abutment surfaces on the first end face may extend along the first dividing plane and the transition area between the two second arrays of abutment surfaces on the first end face may extend along the second dividing plane. In other words, the part of the transition area between the two first arrays of abutment surfaces on the first end face is symmetrical with regard to the first dividing plane and the part of the transition area between the two second arrays of abutment surfaces on the first end face is symmetrical with regard to the second dividing plane.

Another embodiment of the invention is characterized in that the two minor side faces are parallel with each other as seen in cross-sectional planes through the cutting insert perpendicularly to the centre axis of the through hole, and that the first dividing plane extends halfway between the two minor side faces.

According to another embodiment of the invention, the second dividing plane extends halfway between the two major side faces, wherein the two major side faces are preferably parallel with each other.

Another embodiment of the invention is characterized in:

that the two major side faces are parallel with each other, wherein an imaginary median plane extends halfway between the two major side faces in parallel with the two major side faces; and that each one of the two end faces has 180° rotational symmetry about an imaginary reference axis that is parallel with a first line of intersection between the median plane and a first one of the two minor side faces and with a second line of intersection between the median plane and the other one of the two minor side faces and that extends in the median plane and halfway between the first line of intersection and the second line of intersection.

The two minor side faces preferably have 180° rotational symmetry with each other with respect to the centre axis of the through hole. Furthermore, the two end faces preferably have 180° rotational symmetry with each other with respect to the centre axis of the through hole.

According to another embodiment of the invention, each abutment surface in the first and the second group of abutment surfaces forms an angle α of 50-89°, preferably 65-75°, with the adjacent major side face. An angle α smaller than 50° results in a deteriorated strength of the cutting edge associated with the major side face and difficulties to machine the tangential support surfaces close to a bottom surface of the insert seat where the screw hole for the fastening element is provided. When the angle α is smaller than 50°, there is a risk that the cutting insert, as a result of cutting forces, gets stuck in the insert seat and wedged between the bottom surface of the insert seat and the tangential support surface close to the bottom surface. When the angle α is smaller than 50°, chip forming might be deteriorated, especially for some materials. An angle α larger than 88° has poor effect with regard to stability. An angle α larger than 89° has no effect. An angle α within the range 65-75° gives good strength of the cutting edge in combination with good machinability of the tangential support surfaces. An angle α within the range 65-75° offers the best combination of strength of the cutting edge, stability, good machinability of the tangential support surfaces and good chip forming. Each abutment surface in the first and the second group of abutment surfaces preferably has an associated set of cutting edges comprising a secondary cutting edge formed at an intersection between one of the first and the second end face on which the abutment surface is provided and the minor side face associated with the abutment surface, the secondary cutting edge being adjacent to the abutment surface and preferably forming the same angle α with the major side surface associated with the abutment surface.

According to another embodiment of the invention, each abutment surface in the first and the second group of abutment surfaces forms an angle β of 60-89°, preferably 75-85°, with the adjacent minor side face. An angle β smaller than 60° results in a deteriorated strength of the cutting edge associated with the minor side face. When the angle β is smaller than 60°, chip forming might be deteriorated, especially at small depths of cut, and the machining of the tangential support surfaces in the insert seat might be difficult. An angle β larger than 89° has poor effect with regard to stability. An angle β within the range 75-85° offers the best combination of strength of the cutting edge, stability, good machinability of the tangential support surfaces and good chip forming. Each abutment surface in the first and the second group of abutment surfaces preferably has an associated set of cutting edges comprising a primary cutting edge formed at an intersection between one of the first and the second end face on which the abutment surface is provided and the major side face associated with the abutment surface, the primary cutting edge being adjacent to the abutment surface and preferably forming the same angle β with the minor side surface associated with the abutment surface. When the primary cutting edge forms the same angle β with the minor side surface, and when the angle β is smaller than 60°, the cutting insert may be subjected to pulling forces tending to pull the cutting insert out of the insert seat.

Preferably, the angle α is smaller than or equal to the angle β. If α>β, the chips created by the cutting insert might have an unfavourable direction.

Another embodiment of the invention is characterized in:

that rake surfaces are provided on the first end face between each one of the cutting edges in the first group of cutting edges and the adjacent abutment surface in the first group of abutment surfaces; and that rake surfaces are provided on the second end face between each one of the cutting edges in the second group of cutting edges and the adjacent abutment surface in the second group of abutment surfaces.

The inclination of the rake surfaces may differ from the inclination of the adjacent abutment surfaces such that the rake surfaces will guide the chips produced by the cutting insert during the machining of a workpiece away from the abutment surfaces on the end face presently serving as leading face of the cutting insert, to thereby reduce the erosion of these abutment surfaces. However, the two end faces may lack separate rake surfaces between the cutting edges and the adjacent abutment surfaces. In the latter case, the abutment surfaces on the end faces will serve as rake surfaces.

The two major side faces of the cutting insert are preferably parallel with each other and/or plane, or at least substantially plane. The expression "substantially plane" means plane within manufacturing tolerances.

Another embodiment of the invention is characterized in:

that the first group of cutting edges comprises four first sets of cutting edges, wherein each first set of cutting edges comprises a primary cutting edge formed at an intersection between the first end face and one of the two major side faces, a corner cutting edge formed at an intersection between the first end face and one of the four corner side faces and a secondary cutting edge formed at an intersection between the first end face and one of the two minor side faces, and wherein the primary cutting edge, the corner cutting edge and the secondary cutting edge of each one of the first sets of cutting edges are located in series with each other with the corner cutting edge located between the primary cutting edge and the secondary cutting edge; and that the second group of cutting edges comprises four second sets of cutting edges, wherein each second set of cutting edges comprises a primary cutting edge formed at an intersection between the second end face and one of the two major side faces, a corner cutting edge formed at an intersection between the second end face and one of the four corner side faces and a secondary cutting edge formed at an intersection between the second end face and one of the two minor side faces, and wherein the primary cutting edge, the corner cutting edge and the secondary cutting edge of each one of the second sets of cutting edges are located in series with each other with the corner cutting edge located between the primary cutting edge and the secondary cutting edge.

The double-sided tangential cutting insert according to the present invention is particularly intended to be used as a cutting insert in a milling tool to be used for groove milling, corner milling or face milling. However, the double-sided tangential cutting insert according to the present invention may also be used as a cutting insert in a turning tool.

Further advantageous features of the double-sided tangential cutting insert according to the present invention will appear from the description following below.

The invention also relates to a tool comprising a tool body and a double-sided tangential cutting insert of the above-mentioned type mounted in an insert seat of the tool body.

Further advantageous features of the tool according to the present invention will appear from the description following below.

BRIEF DESCRIPTION OF THE DRAWINGS

With reference to the appended drawings, a specific description of embodiments of the invention cited as examples follows below. In the drawings.

DETAILED DESCRIPTION OF EMBODIMENTS OF THE INVENTION

Figure 1A:
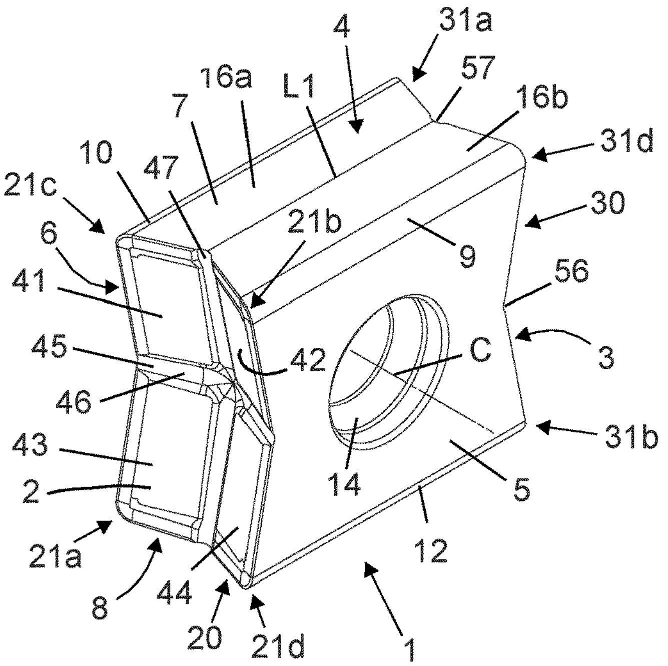
FIG. 1*a* is a perspective view of a cutting insert according to a first embodiment of the present invention.
Figure 1B:
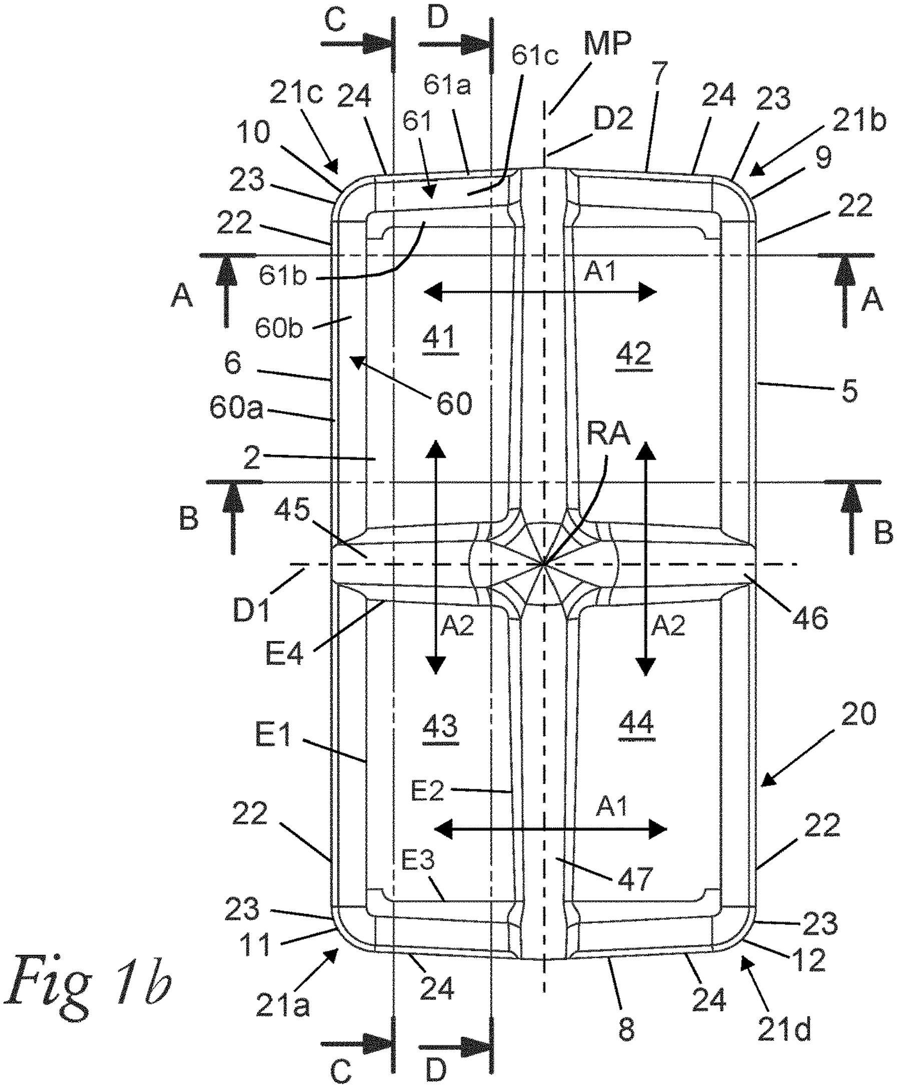
FIG. 1*b* is an end view from a first end of the cutting insert of FIG. 1*a*.
Figure 1C:
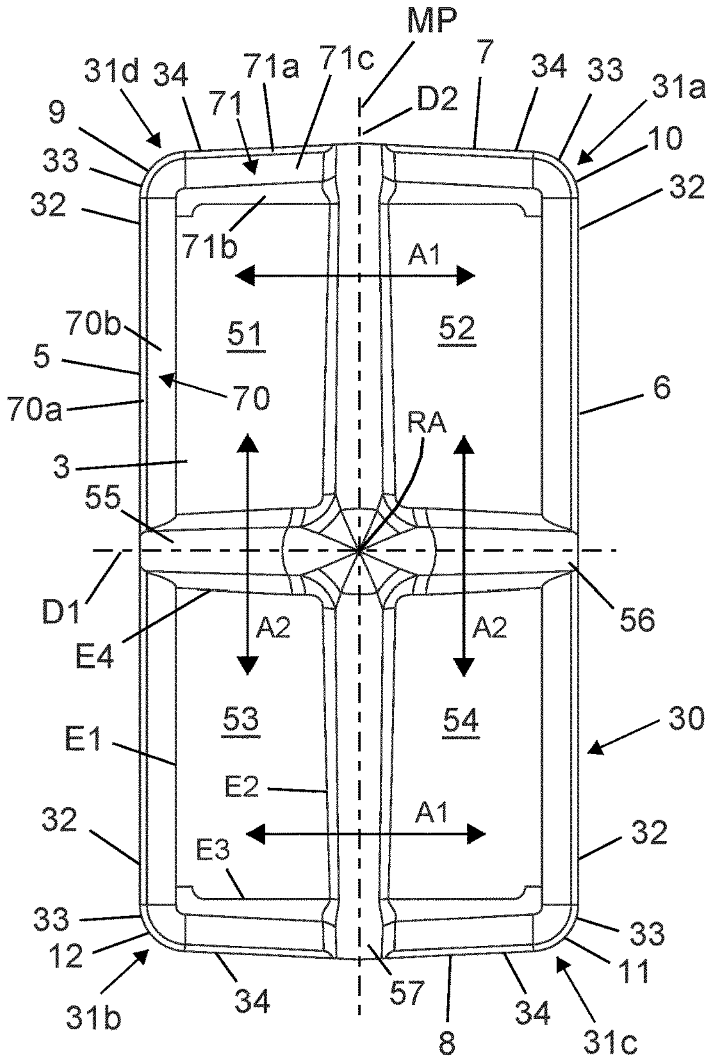
FIG. 1*c* is an end view from an opposite second end of the cutting insert of FIG. 1*a*.
Figure 1D:
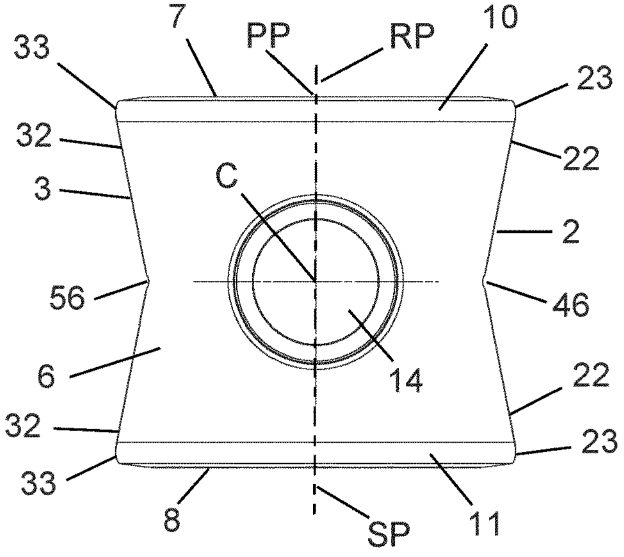
FIG. 1*d* is a lateral view from a major side of the cutting insert of FIG. 1*a*.
Figure 1E:
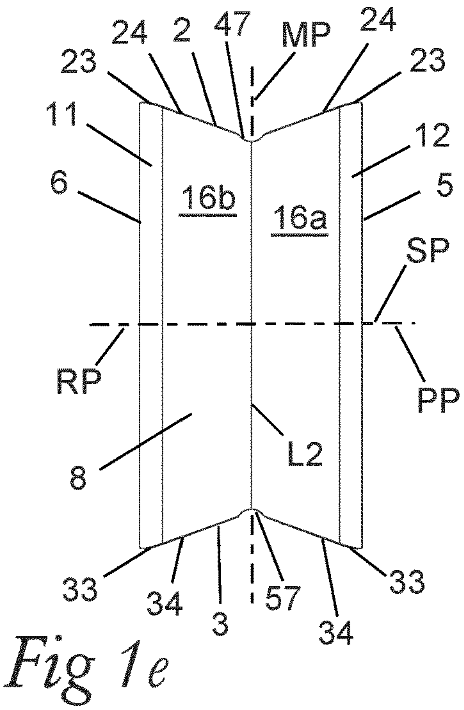
FIG. 1*e* is a lateral view from a minor side of the cutting insert of FIG. 1*a*.

Different embodiments of a double-sided tangential cutting insert 1 according to the present invention are illustrated in FIGS. 1*a*-1*i*, 2*a*-2*d*, 3*a*-3*d*, 4*a*-4*d*, 5*a*-5*d*, 6*a*-6*d*, 7*a*-7*d* and 11*a*-11*e*. The cutting insert 1 is configured for use in milling or turning and is to be used in a milling or turning tool, for instance a milling tool 80 of the type illustrated in FIGS. 8-10.

The cutting insert 1 has a polygonal basic shape and is turnable into eight different working positions. The cutting insert 1 comprises a first end face 2 and a second end face 3 arranged opposite to each other on opposite sides of the cutting insert. The two end faces 2, 3 are configured to serve as leading and trailing faces of the cutting insert 1 when the cutting insert is mounted to a tool body 81 (see FIGS. 8-10) and as seen in an intended direction of rotation R of the tool body. Thus, the cutting insert 1 is configured to be mounted in an insert seat 84*a*, 84*b* of a tool body 81 with one of the two end faces 2, 3 facing forward in the intended direction of rotation R of the tool body and the other end face facing rearward in the intended direction of rotation R of the tool body.

A peripheral surface 4 extends around the cutting insert 1 between the two end faces 2, 3. The peripheral surface 4 comprises:

- a first major side face 5 and a second major side face 6 arranged opposite to each other on opposite sides of the cutting insert 1;
- a first minor side face 7 and a second minor side face 8 arranged between the two major side faces 5, 6, wherein the two minor side faces 7, 8 are arranged opposite to each other on opposite sides of the cutting insert 1;
- a first corner side face 9 arranged between the first major side face 5 and the first minor side face 7;
- a second corner side face 10 arranged between the first minor side face 7 and the second major side face 6;
- a third corner side face 11 arranged between the second major side face 6 and the second minor side face 8; and
- a fourth corner side face 12 arranged between the second minor side face 8 and the first major side face 5.

A through hole 14 extends through the cutting insert 1 between the two major side faces 5, 6. The through hole 14 is configured to receive a fastening element 15 (see FIGS. 8 and 10) in the form of a screw, by means of which the cutting insert may be releasably fixed in an insert seat 84*a*, 84*b* of a tool body 81. In the illustrated embodiments, the through hole 14 extends centrally through the cutting insert between the two major faces 5, 6.

In the illustrated embodiments, the two major side faces 5, 6 are parallel with each other and plane, or at least substantially plane. A median plane MP, which constitutes an imaginary plane, extends halfway between and in parallel with the two major side faces 5, 6 perpendicularly to a centre axis C of the through hole 14. The median plane MP intersects the first minor side face 7 along a first line of intersection L1 and the second minor side face 8 along a second line of intersection L2.

In the illustrated embodiments, the two minor side faces 7, 8 are parallel with each other as seen in cross-sectional planes through the cutting insert 1 perpendicularly to the centre axis C of the through hole 14. In these cases, the above-mentioned first and second lines of intersection L1, L2 extend in parallel with each other. In the illustrated embodiments, each one of the minor side faces 7, 8 comprises two plane, or at least substantially plane, surfaces 16*a*, 16*b* which are slightly inclined in relation to each other and meet each other along the line of intersection L1, L2 between the minor side face 7, 8 and the above-mentioned median plane MP. However, the two minor side faces 7, 8 may as an alternative be plane, or at least substantially plane.

In the illustrated embodiments, the corner side faces 9-12 are formed as curved surfaces with a radius of curvature. The radius of curvature may be the same for all corner side faces 9-12. However, the corner side faces 9-12 may also have mutually different radius of curvature. As a further alternative, one or more of the corner side faces 9-12 may be plane, or at least substantially plane, and form a respective chamfered corner on the cutting insert 1.

Cutting edges are formed along the periphery of each one of the first and the second end face 2, 3. A first group of cutting edges 20 are distributed along the periphery of the first end face 2 and formed at the intersection between the first end face 2 and the peripheral surface 4. A second group of cutting edges 30 are distributed along the periphery of the second end face 3 and formed at the intersection between the second end face 3 and the peripheral surface 4.

In the illustrated embodiments, the first group of cutting edges 20 comprises four separate first sets of cutting edges 21*a*-21*d*, which correspond to a respective working position of the eight available working positions of cutting insert 1. Each first set of cutting edges 21*a*-21*d* comprises:

- a primary cutting edge 22 formed at an intersection between the first end face 2 and one of the two major side faces 5, 6;
- a corner cutting edge 23 formed at an intersection between the first end face 2 and one of the four corner side faces 9-12; and
- a secondary cutting edge 24 formed at an intersection between the first end face 2 and one of the two minor side faces 7, 8.

The primary cutting edge 22, the corner cutting edge 23 and the secondary cutting edge 24 of each one of the first sets of cutting edges 21*a*-21*d* are arranged one after the other with the corner cutting edge 23 located between the primary cutting edge 22 and the secondary cutting edge 24.

In the illustrated embodiments, the second group of cutting edges 30 comprises four separate second sets of cutting edges 31*a*-31*d*, which correspond to a respective working position of the eight available working positions of cutting insert 1. Each second set of cutting edges 31*a*-31*d* comprises:

- a primary cutting edge 32 formed at an intersection between the second end face 3 and one of the two major side faces 5, 6;
- a corner cutting edge 33 formed at an intersection between the second end face 3 and one of the four corner side faces 9-12; and
- a secondary cutting edge 34 formed at an intersection between the second end face 3 and one of the two minor side faces 7, 8.

The primary cutting edge 32, the corner cutting edge 33 and the secondary cutting edge 34 of each one of the second sets of cutting edges 31*a*-31*d* are arranged one after the other with the corner cutting edge 33 located between the primary cutting edge 32 and the secondary cutting edge 34.

Abutment surfaces configured to serve as tangential abutment surfaces of the cutting insert 1 in different working positions of the cutting insert are provided on the first and the second end face 2, 3. These abutment surfaces comprise a first group of abutment surfaces 41-44 provided on the first end face 2 and a second group of abutment surfaces 51-54 provided on the second end face 3. Each one of the first and the second group of abutment surfaces comprises four plane, or at least substantially plane, abutment surfaces 41-44, 51-54 arranged on the associated end face 2, 3 in a grid-like pattern with two first arrays A1 or rows, each of which comprising two consecutive abutment surfaces (41 and 42; 43 and 44; 51 and 52; 53 and 54) and extending between the two major side faces 2, 3, and two second arrays A2 or columns, each of which comprising two consecutive abutment surfaces (41 and 43; 42 and 44; 51 and 53; 52 and 54) and extending between the two minor side faces 7, 8.

The four abutment surfaces 41-44, 51-54 on each one of the two end faces 2, 3 are separated from each other by a transition area 45, 55, which is formed like a cross with four arms, each arm being received between two consecutive abutment surfaces in one of the first arrays A1 or in one of the second arrays A2. In the embodiments illustrated in FIGS. 1-5, the transition area 45, 55 on each one of the two end faces 2, 3 has a concave cross-sectional shape, which implies that each arm of the transition area is concave as seen in a cross section through the arm. However, the transition area 45, 55 on each one of the two end faces 2, 3 may as an alternative have a convex cross-sectional shape, as illustrated in FIGS. 6*a*-6*d*.

In the embodiment illustrated in FIGS. 4*a*-4*d*, the transition area 45 on the first end face 2 has a concave cross-sectional shape and is formed by a first smooth concave transition 46 which is tangentially connected to each of the four abutment surfaces 41-44, and an intersecting second smooth concave transition 47 which is also tangentially connected to each of the four abutment surfaces 41-44. In the same way, the transition area on the second end face 3 has a concave cross-sectional shape and is formed by a first smooth concave transition which is tangentially connected to each of the four abutment surfaces of the second end face 3 and an intersecting second smooth concave transition which is also tangentially connected to each of the four abutment surfaces of the second end surface 3.

In the embodiment illustrated in FIGS. 1*a*-1*i*, the transition area 45, 55 on each one of the two end faces 2, 3 is formed by a first groove 46, 56, which extends on the associated end face between the two first arrays A1 of abutment surfaces, and an intersecting second groove 47, 57, which extends on the associated end face between the two second arrays A2 of abutment surfaces.

Figure 1F:
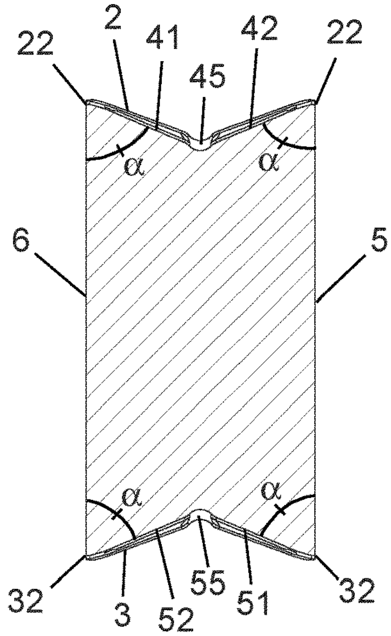
FIG. 1*f* is a cut according to the line A-A in FIG. 1*b*.
Figure 1G:
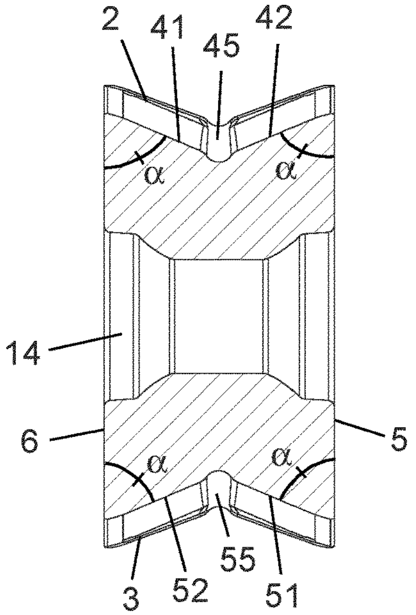
FIG. 1*g* is a cut according to the line B-B in FIG. 1*b*.
Figure 1H:
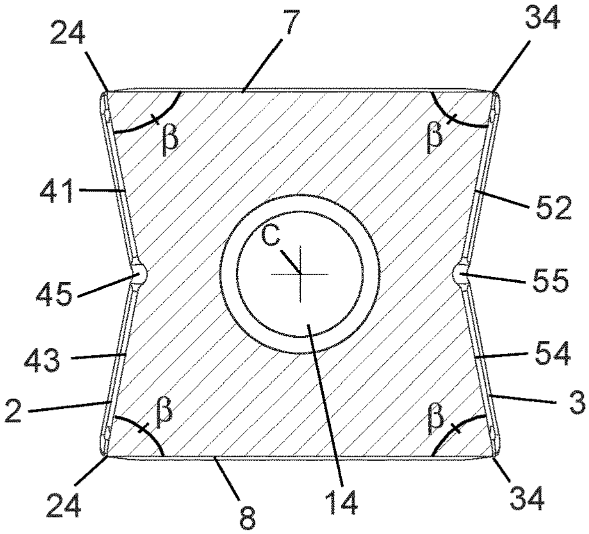
FIG. 1*h* is a cut according to the line C-C in FIG. 1*b*.
Figure 1I:
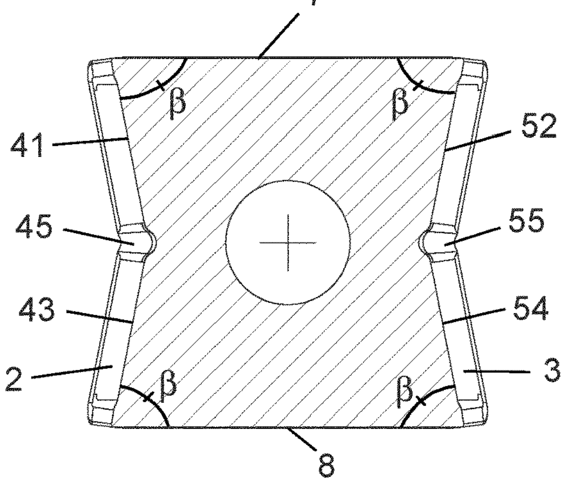
FIG. 1*i* is a cut according to the line D-D in FIG. 1*b*.
Figure 2A:
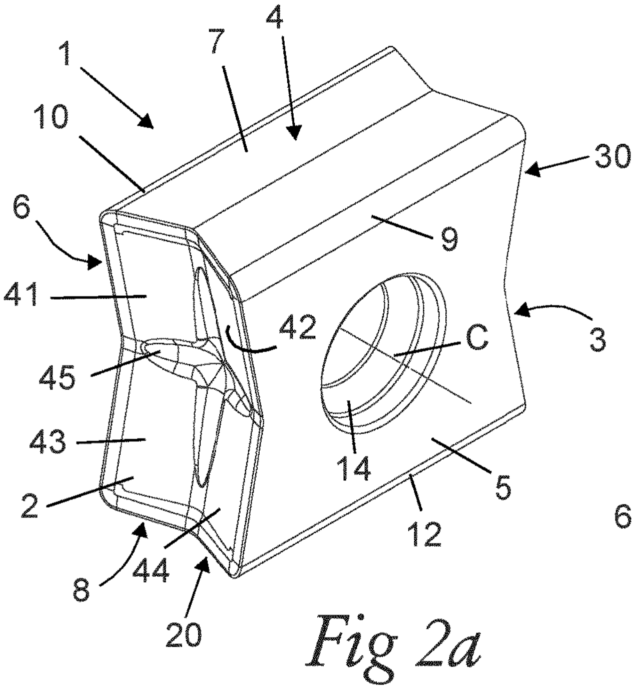
FIG. 2*a* is a perspective view of a cutting insert according to a second embodiment of the invention.
Figure 2B:
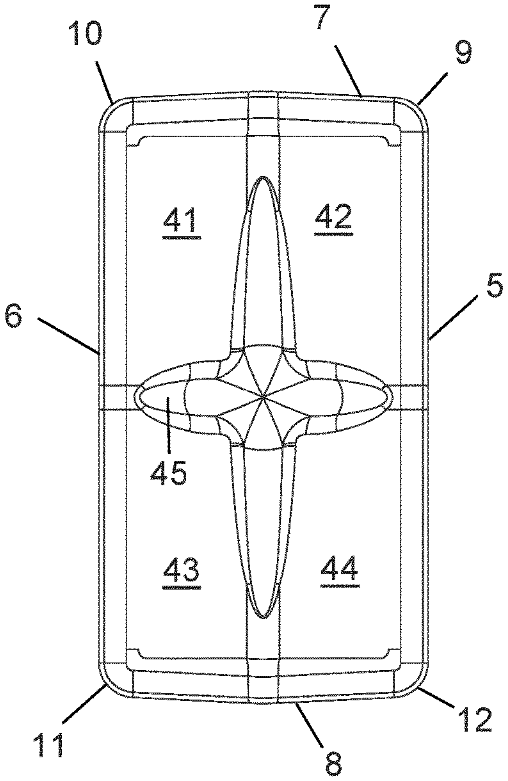
FIG. 2*b* is an end view of the cutting insert of FIG. 2*a*.
Figure 2C:
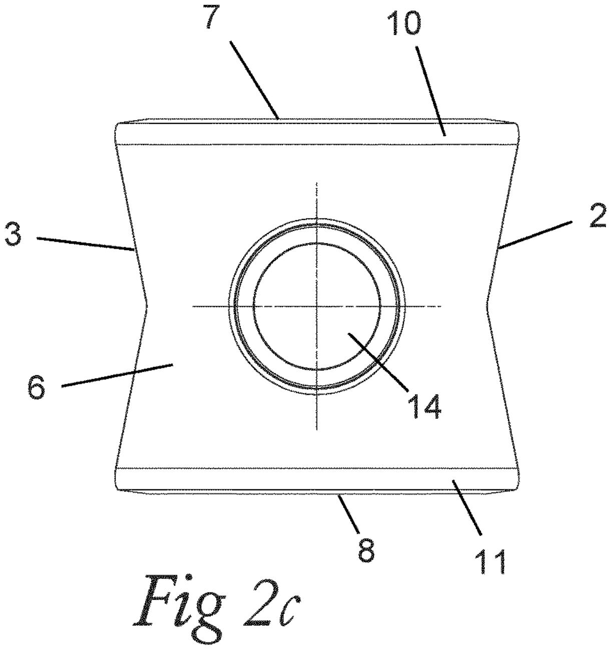
FIG. 2*c* is a lateral view from a major side of the cutting insert of FIG. 2*a*.
Figure 2D:
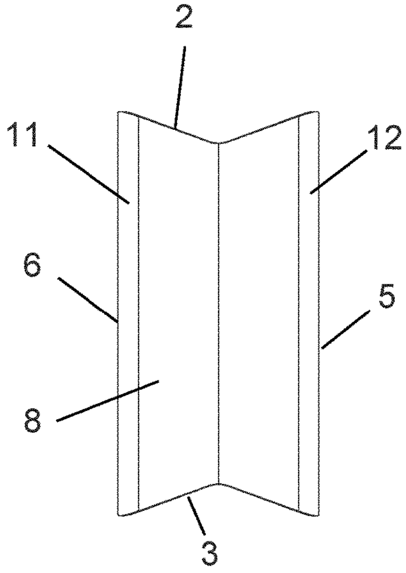
FIG. 2*d* is a lateral view from a minor side of the cutting insert of FIG. 2*a*.
Figure 3A:
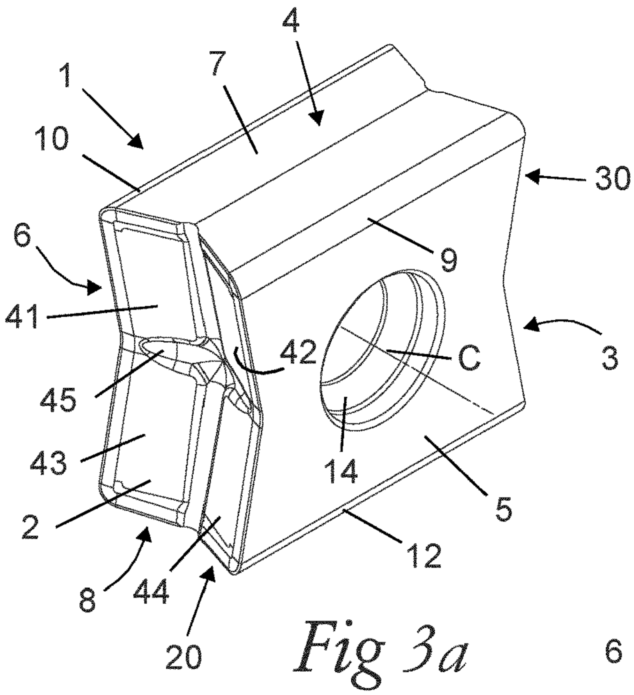
FIG. 3*a* is a perspective view of a cutting insert according to a third embodiment of the invention.
Figure 3B:
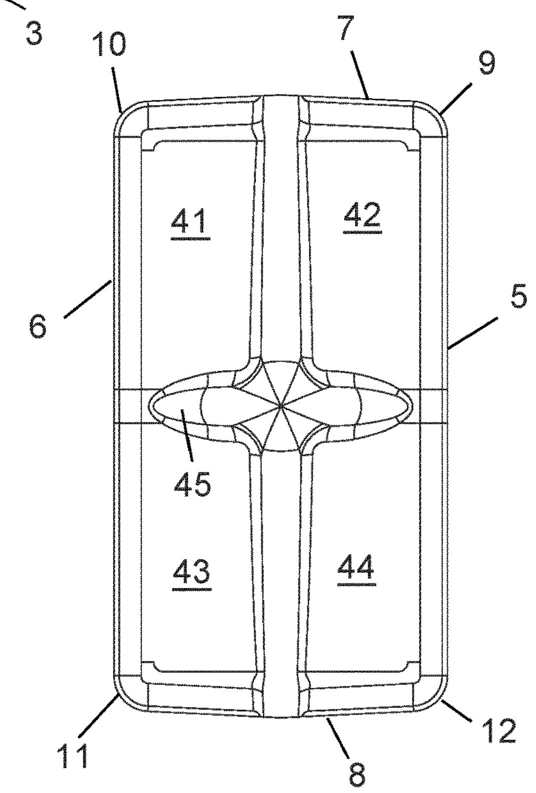
FIG. 3*b* is an end view of the cutting insert of FIG. 3*a*.
Figure 3C:
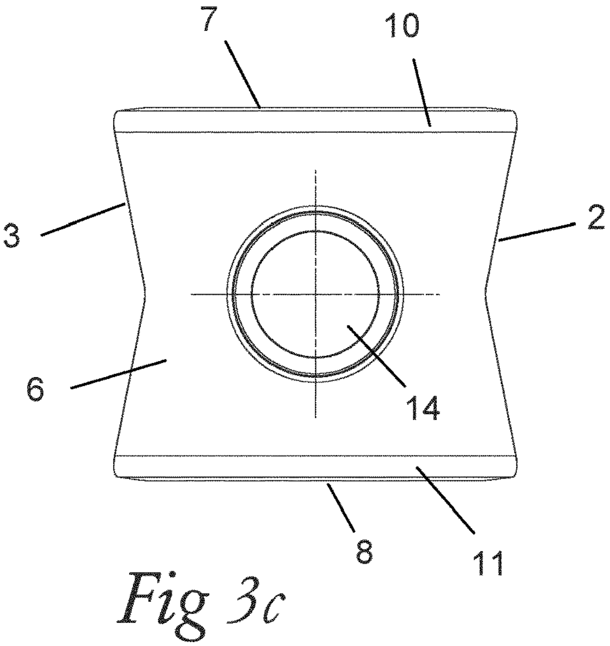
FIG. 3*c* is a lateral view from a major side of the cutting insert of FIG. 3*a*.
Figure 3D:
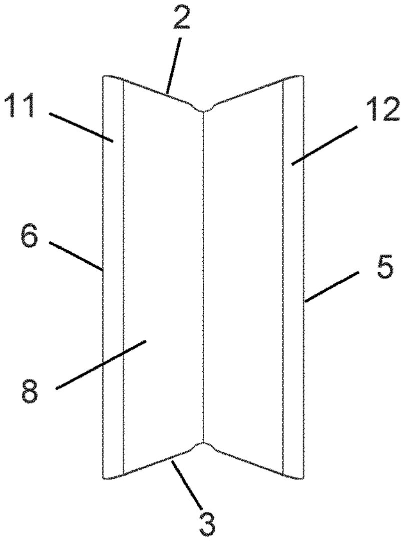
FIG. 3*d* is a lateral view from a minor side of the cutting insert of FIG. 3*a*.
Figure 4A:
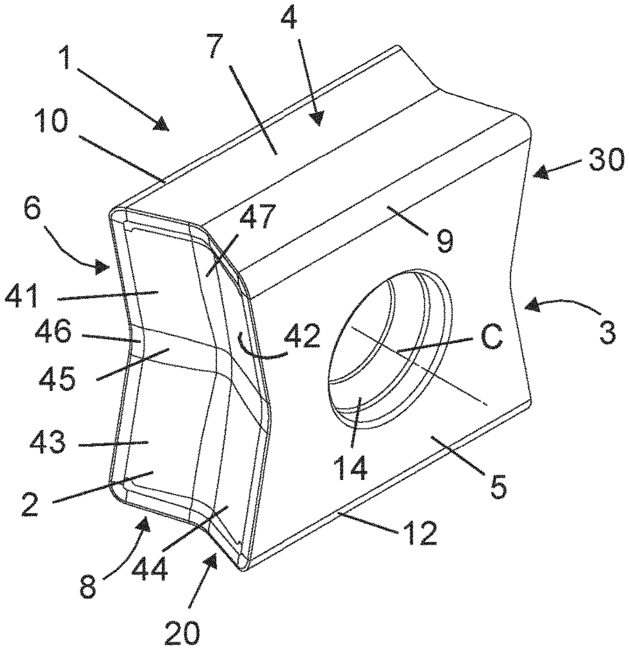
FIG. 4*a* is a perspective view of a cutting insert according to a fourth embodiment of the invention.
Figure 4B:
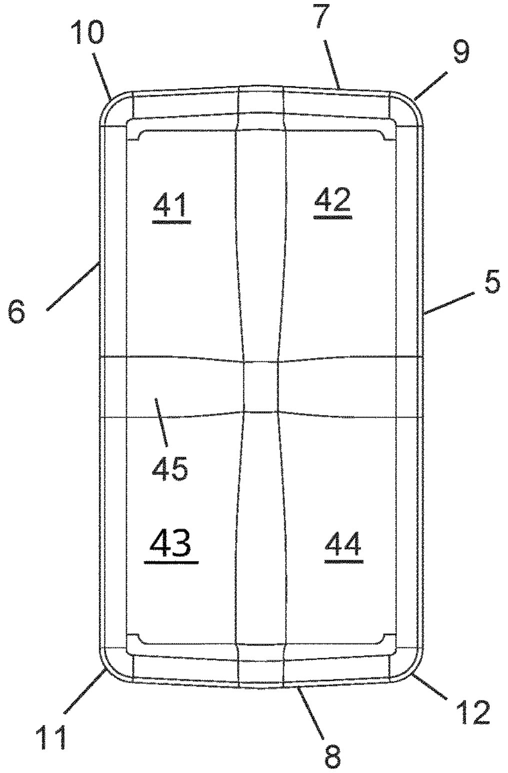
FIG. 4*b* is an end view of the cutting insert of FIG. 4*a*.
Figure 4C:
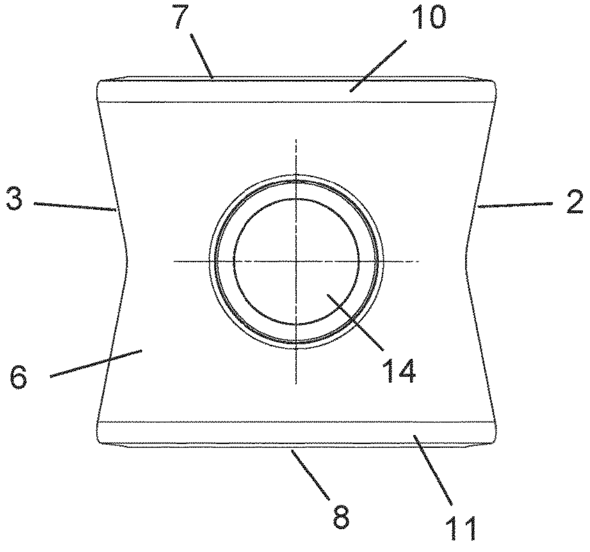
FIG. 4*c* is a lateral view from a major side of the cutting insert of FIG. 4*a*.
Figure 4D:
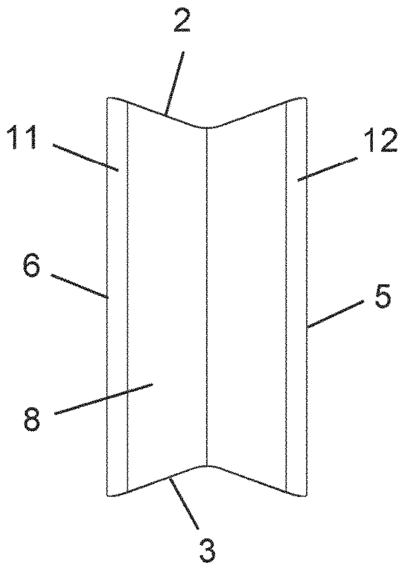
FIG. 4*d* is a lateral view from a minor side of the cutting insert of FIG. 4*a*.
Figure 5A:
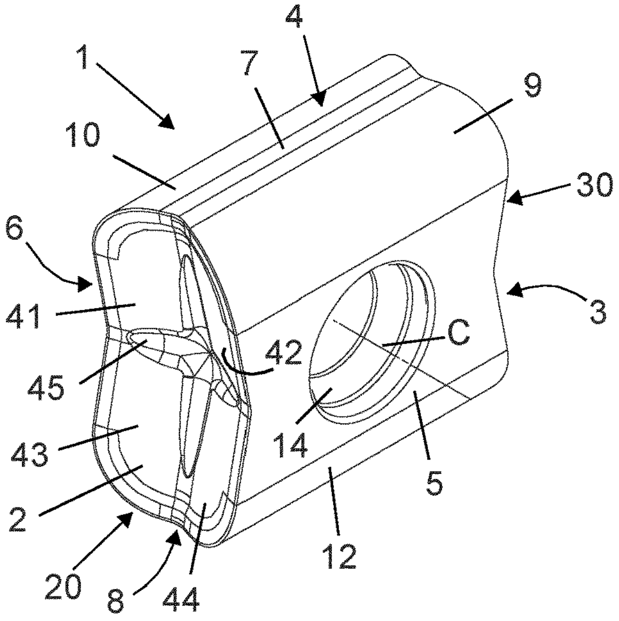
FIG. 5*a* is a perspective view of a cutting insert according to a fifth embodiment of the invention.
Figure 5B:
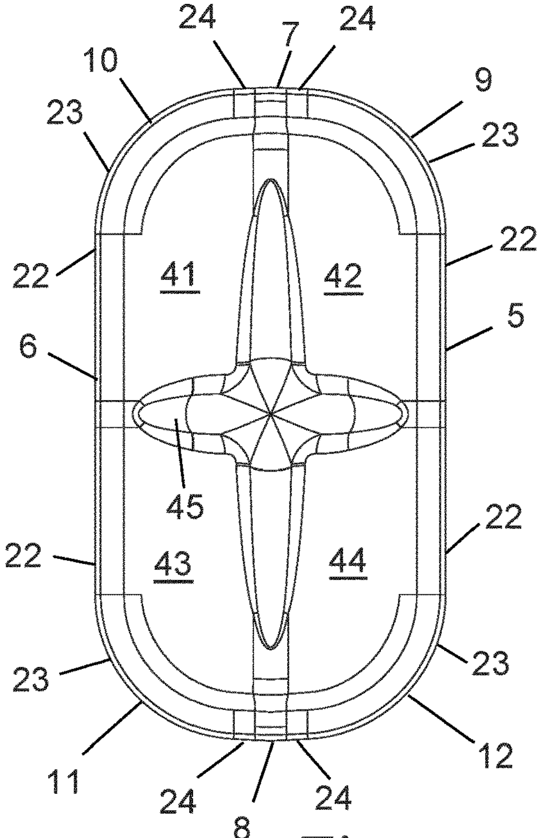
FIG. 5*b* is an end view of the cutting insert of FIG. 5*a*.
Figure 5C:
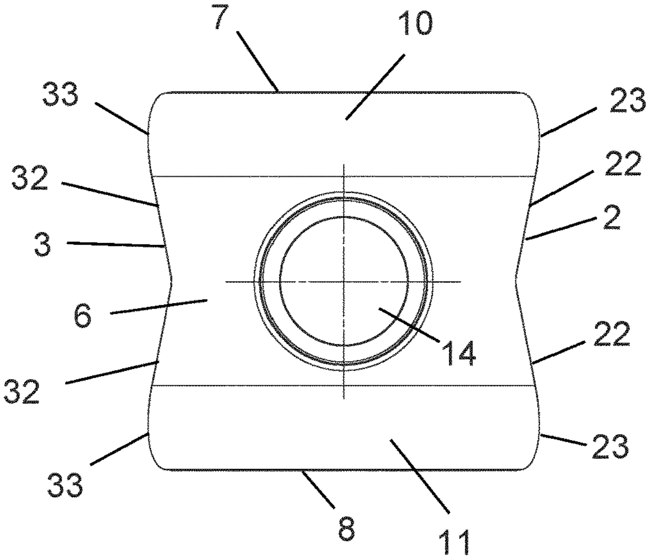
FIG. 5*c* is a lateral view from a major side of the cutting insert of FIG. 5*a*.
Figure 5D:
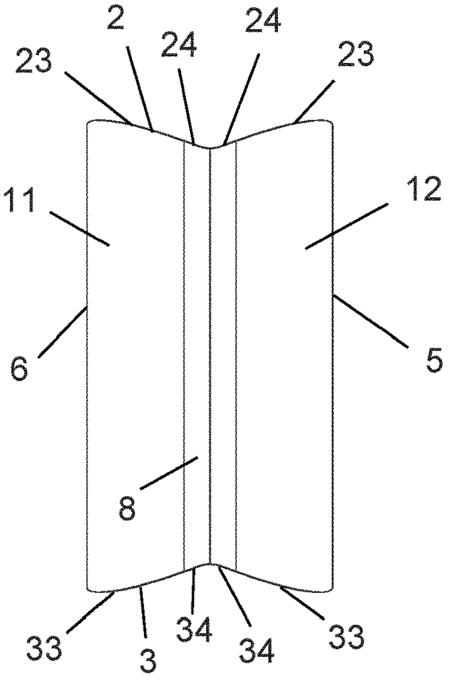
FIG. 5*d* is a lateral view from a minor side of the cutting insert of FIG. 5*a*.
Figure 6A:
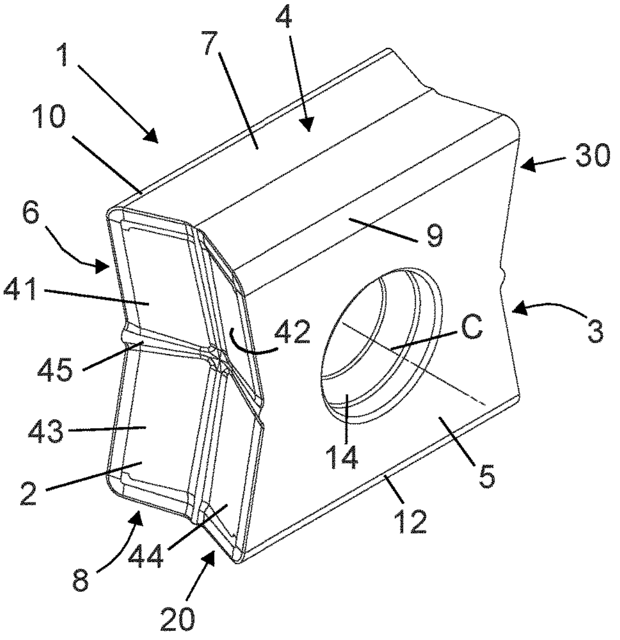
FIG. 6*a* is a perspective view of a cutting insert according to a sixth embodiment of the invention.
Figure 6B:
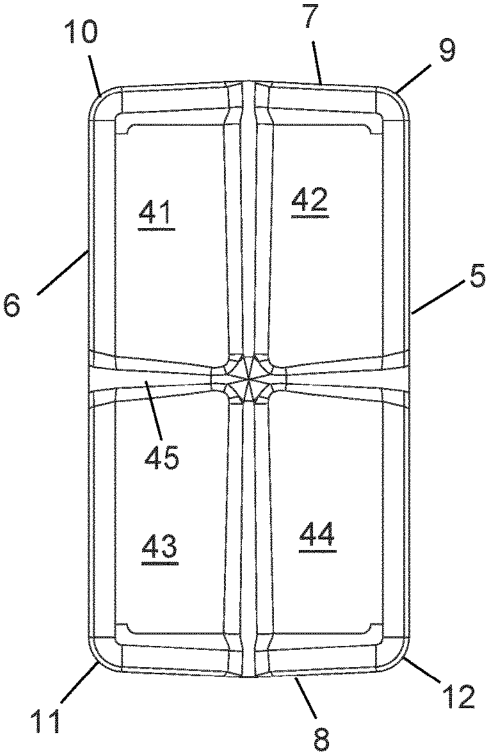
FIG. 6*b* is an end view of the cutting insert of FIG. 6*a*.
Figure 6C:
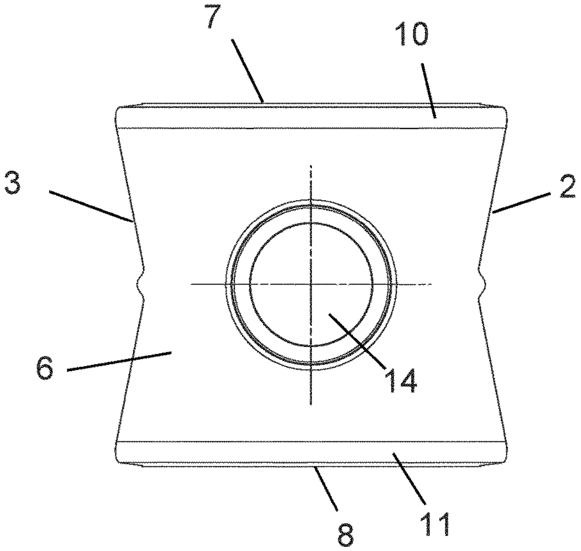
FIG. 6*c* is a lateral view from a major side of the cutting insert of FIG. 6*a*.
Figure 6D:
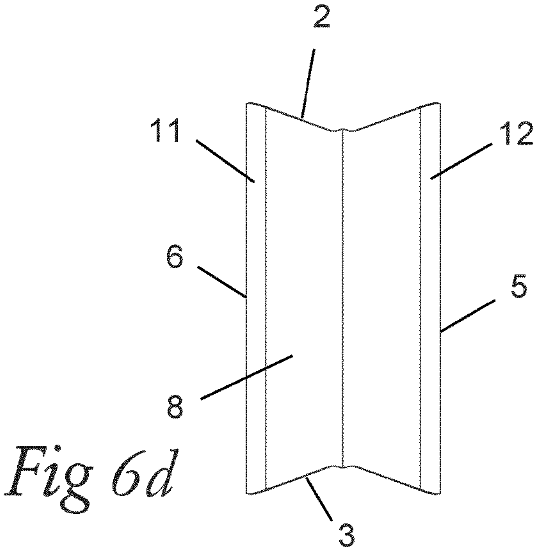
FIG. 6*d* is a lateral view from a minor side of the cutting insert of FIG. 6*a*.
Figure 7A:
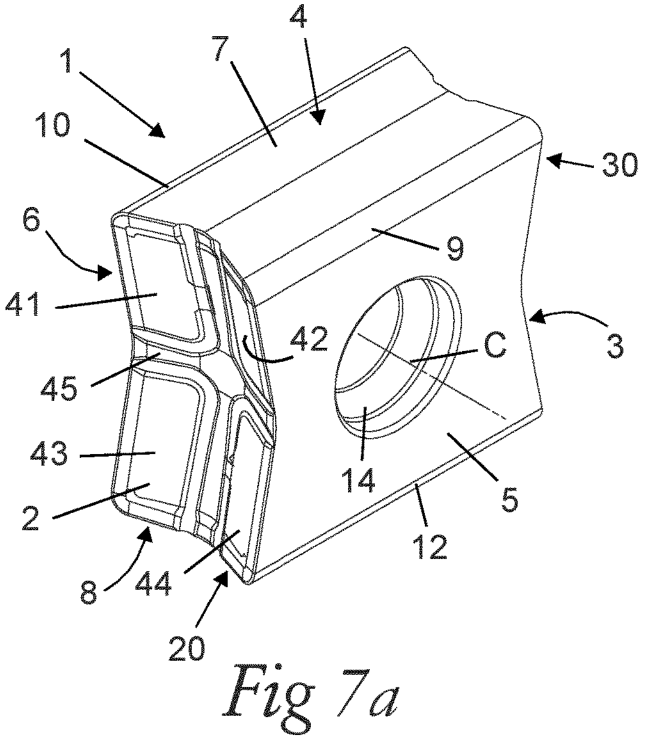
FIG. 7*a* is a perspective view of a cutting insert according to a seventh embodiment of the invention.
Figure 7B:
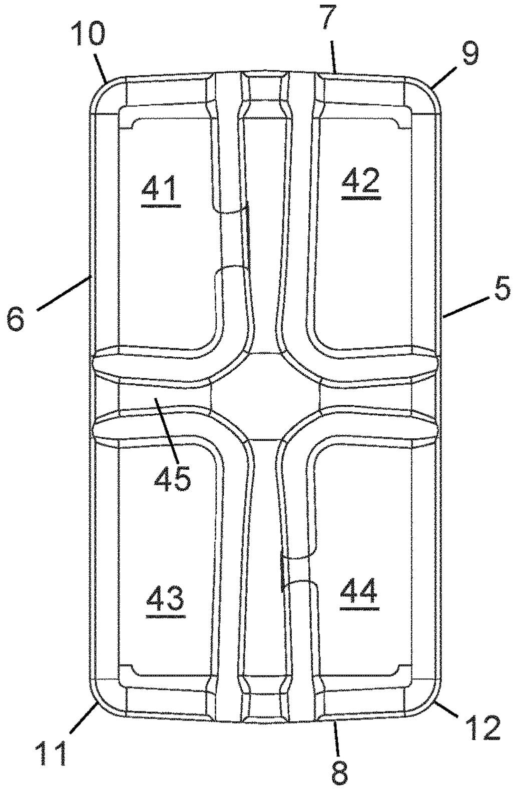
FIG. 7*b* is an end view of the cutting insert of FIG. 7*a*.
Figure 7C:
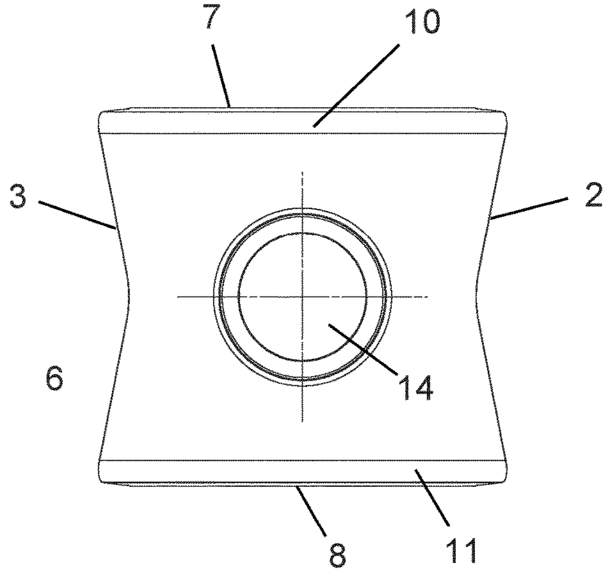
FIG. 7*c* is a lateral view from a major side of the cutting insert of FIG. 7*a*.
Figure 7D:
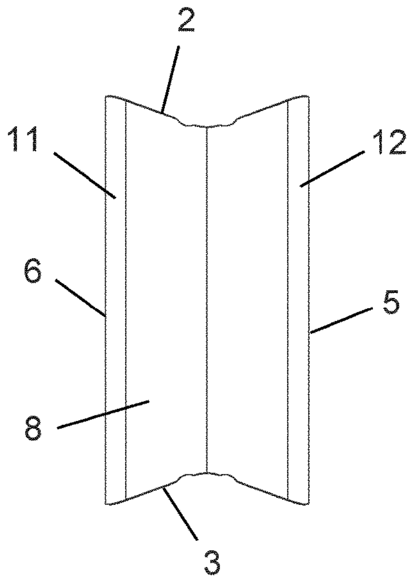
FIG. 7*d* is a lateral view from a minor side of the cutting insert of FIG. 7*a*, FIGS. 8*a* and 8*b* are perspective views from different directions of a milling tool provided with cutting inserts according to the invention, as seen with a cutting insert removed from its insert seat in the tool body of the milling tool.

Each abutment surface 41-44 in the first group of abutment surfaces is inclined inwards in the cutting insert 1 as seen in a direction from a first edge E1 of the abutment surface facing the adjacent major side face 5, 6 towards an opposite second edge E2 of the abutment surface facing the other abutment surface in the same first array A1 and also inclined inwards in the cutting insert 1 as seen in a direction from a third edge E3 of the abutment surface facing the adjacent minor side face 7, 8 towards an opposite fourth edge E4 of the abutment surface facing the other abutment surface in the same second array A2. Hereby, each two consecutive abutment surfaces (41 and 42; 43 and 44) in each one of the two first arrays A1 of abutment surfaces on the first end face 2 are inclined towards each other in a V-shaped configuration, as illustrated in FIGS. 1*f* and 1*g*, and each two consecutive abutment surfaces (41 and 43; 42 and 44) in each one of the two second arrays A2 of abutment surfaces on the first end face 2 are inclined towards each other in a V-shaped configuration, as illustrated in FIGS. 1*h* and 1*i*.

In a corresponding manner, each abutment surface 51-54 in the second group of abutment surfaces is inclined inwards in the cutting insert 1 as seen in a direction from a first edge E1 of the abutment surface facing the adjacent major side face 5, 6 towards an opposite second edge E2 of the abutment surface facing the other abutment surface in the same first array A1 and also inclined inwards in the cutting insert 1 as seen in a direction from a third edge E3 of the abutment surface facing the adjacent minor side face 7, 8 towards an opposite fourth edge E4 of the abutment surface facing the other abutment surface in the same second array A2. Hereby, each two consecutive abutment surfaces (51 and 52; 53 and 54) in each one of the two first arrays A1 of abutment surfaces on the second end face 3 are inclined towards each other in a V-shaped configuration, as illustrated in FIGS. 1*f* and 1*g*, and each two consecutive abutment surfaces (51 and 53; 52 and 54) in each one of the two second arrays A2 of abutment surfaces on the second end face 3 are inclined towards each other in a V-shaped configuration, as illustrated in FIGS. 1*h* and 1*i*.

Each abutment surface 41-44, 51-54 in the first and second groups of abutment surfaces forms an angle $\alpha$ (see FIGS. 1*f* and 1*g*) of 50-89°, preferably 65-75°, with the adjacent major side face 5, 6, and an angle $\beta$ (see FIGS. 1*h* and 1*i*) of 60-89°, preferably 75-85°, with the adjacent minor side face 7, 8.

The four first sets of cutting edges 21*a*-21*d* are associated with a respective abutment surface 41-44 in the first group of abutment surfaces such that the primary cutting edge 22 in each first set of cutting edges extends along the first edge E1 of the associated abutment surface 41-44 and the secondary cutting edge 24 in each first set of cutting edges extends along the third edge E3 of the associated abutment surface 41-44. In the corresponding manner, the four second sets of cutting edges 31*a*-31*d* are associated with a respective abutment surface 51-54 in the second group of abutment surfaces such that the primary cutting edge 32 in each second set of cutting edges extends along the first edge E1 of the associated abutment surface 51-54 and the secondary cutting edge 34 in each second set of cutting edges extends along the third edge E3 of the associated abutment surface 51-54.

The above-mentioned abutment surfaces 41-44, 51-54 and transition areas 45, 55 on the two end faces 2, 3 are with advantage of such sizes in relation to each other that each one of the quotients $A_{T1}/A_{A1}$ and $A_{T2}/A_{A2}$ is smaller than or equal to 1, preferably smaller than or equal to 0.85, more preferably smaller than or equal to 0.5 and most preferably smaller than or equal to 0.3, where:

$A_{A1}$ is the total projected area of an orthographic parallel projection of the four abutment surfaces 41-44 in the first group of abutment surfaces onto an imaginary projection plane PP that contains the centre axis C of the through hole 14 and extends perpendicularly to the two minor side faces 7, 8;

$A_{A2}$ is the total projected area of an orthographic parallel projection of the four abutment surfaces 51-54 in the second group of abutment surfaces onto the projection plane PP;

$A_{T1}$ is the projected area of an orthographic parallel projection of the above-mentioned transition area 45 on the first end face 2 onto the projection plane PP; and $A_{T2}$ is the projected area of an orthographic parallel projection of the above-mentioned transition area 55 on the second end face 3 onto the projection plane PP.

Each one of the above-mentioned transition areas 45, 55 is preferably arranged at a lower level in the cutting insert 1 than the four abutment surfaces 41-44, 51-54 on the same end face 2, 3 in such a manner that at least a part of each one of the four abutment surfaces 41-44, 51-54 on the end face 2, 3 in question is located at a longer distance from an imaginary reference plane RP that contains the centre axis C of the through hole 14 and extends perpendicularly to the two minor side faces 7, 8 than each part of the transition area 45, 55 on the same end face 2, 3. The reference plane RP coincides with the above-mentioned projection plane PP.

The first end face 2 is divided into four sections by an imaginary first dividing plane D1, which extends between and separates the two first arrays A1 of abutment surfaces on the first end face 2, and an imaginary second dividing plane D2, which is transversal to the first dividing plane D1 and extends between and separates the two second arrays A2 of abutment surfaces on the first end face 2. The four abutment surfaces 41-44 included in the first group of abutment surfaces are located in a respective one of these four sections on the first end face 2. In the illustrated embodiments, the two end faces 2, 3 have 180° rotational symmetry with each other with respect to the centre axis C of the through hole 14 and are also mirror symmetrical to each other with respect to a symmetry plane SP that contains the centre axis C of the through hole 14 and extends halfway between the two end faces 2, 3, wherein the first dividing plane D1 also extends between and separates the two first arrays A1 of abutment surfaces on the second end face 3 and the second dividing plane D2 also extends between and separates the two second arrays A2 of abutment surfaces on the second end face 3. The transition area 45 on the first end face 2 extends along the first dividing plane D1 between the two first arrays A1 of abutment surfaces on the first end face 2 and along the second dividing plane D2 between the two second arrays A2 of abutment surfaces on the first end face 2. In a corresponding manner, the transition area 55 on the second end face 3 extends along the first dividing plane D1 between the two first arrays A1 of abutment surfaces on the second end face 3 and along the second dividing plane D2 between the two second arrays A2 of abutment surfaces on the second end face 3.

In the illustrated embodiments, the first dividing plane D1 contains the centre axis C of the through hole 14 and extends halfway between the two minor side faces 7, 8.

In the illustrated embodiments, the second dividing plane D2 is perpendicular to the first dividing plane D1 and extends halfway between the two major side faces 5, 6.

In the illustrated embodiments, each one of the two end faces 2, 3 has 180° rotational symmetry about an imaginary reference axis RA that is parallel with the above-mentioned first and second line of intersection L1, L2 and that extends in the median plane MP halfway between the first line of intersection L1 and the second line of intersection L2.

The two end faces 2, 3 are preferable identical to each other, within manufacturing tolerances, but they may as an alternative differ from each other. In the illustrated embodiments, the two end faces 2, 3 are identical to each other and have 180° rotational symmetry with each other with respect to the centre axis C of the through hole 14. In the illustrated embodiments, also the two minor side faces 7, 8 have 180° rotational symmetry with each other with respect to the centre axis C of the through hole 14.

Rake surfaces 60, 61 may be provided on the first end face 2 between each one of the cutting edges 22-24 in the first group of cutting edges and the adjacent abutment surface 41-44 in the first group of abutment surfaces. Rake surfaces 70, 71 may also be provided on the second end face 3 between each one of the cutting edges 32-34 in the second group of cutting edges and the adjacent abutment surface 51-54 in the second group of abutment surfaces.

In the illustrated embodiments, each rake surface 60, 70 that extend along one of the primary cutting edges 22, 32 is divided into two sections with a first section 60*a*, 70*a* closest to the primary cutting edge 22, 32 and a second section 60*b*, 70*b* located between the first section 60*a*, 70*a* and the adjacent abutment surface 41-44, 51-54, wherein the first and second sections 60*a*, 70*a* are inclined in relation to each other.

In the illustrated embodiments, each rake surface 61, 71 that extend along one of the secondary cutting edges 23, 33 and the adjacent corner cutting edge 24, 34 is divided into three sections with a first section 61*a*, 71*a* closest to the cutting edge 23, 24, 33, 34, a second section 61*b*, 71*b* closest to the adjacent abutment surface 41-44, 51-54 and an intermediate third section 61*c*, 71*c* located between the first section 61*a*, 71*a* and the second section 61*b*, 71*b*, wherein the three sections are inclined in relation to each other.

In the embodiment illustrated in FIGS. 11*a*-11*e*, the transition area 45 on the first end face 2 has a concave cross-sectional shape and is formed by a first smooth concave transition 46 which is tangentially connected to each of the four abutment surfaces 41-44, and an intersecting second smooth concave transition 47 which is also tangentially connected to each of the four abutment surfaces 41-44. The second smooth concave transition 47 turns into a terminating groove 13 that shortens the secondary cutting edges 24 associated to the first end face 2 and the two minor side faces 7, 8, and gives the secondary cutting edges 24 a distinct ending. In the same way, the transition area on the second end face 3 has a concave cross-sectional shape and is formed by a first smooth concave transition which is tangentially connected to each of the four abutment surfaces of the second end face 3 and an intersecting second smooth concave transition which is also tangentially connected to each of the four abutment surfaces of the second end surface 3. The second smooth concave transition on the second end face 3 turns into a terminating groove that shortens the secondary cutting edges 24 associated to the second end face 3 and the two minor side faces 7, 8, and gives the secondary cutting edges 24 a distinct ending. In this way, a length of the secondary cutting edges 24 may be adjusted and shortened to avoid vibrations. In the same way, the first smooth concave transition 46 may turn into a terminating groove 17 that gives a distinct ending to the primary cutting edges 22 associated to the first end face 2 and the two major side faces 5, 6.

Figure 8A:
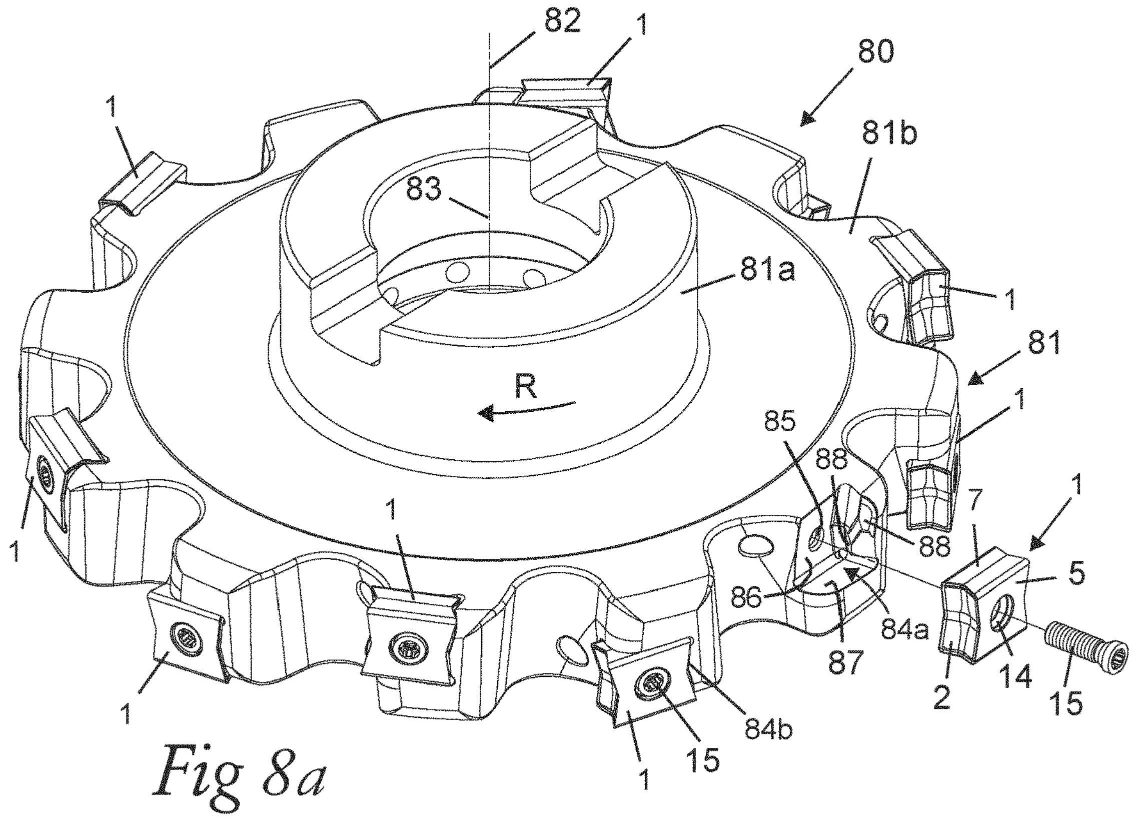
Figure 8B:
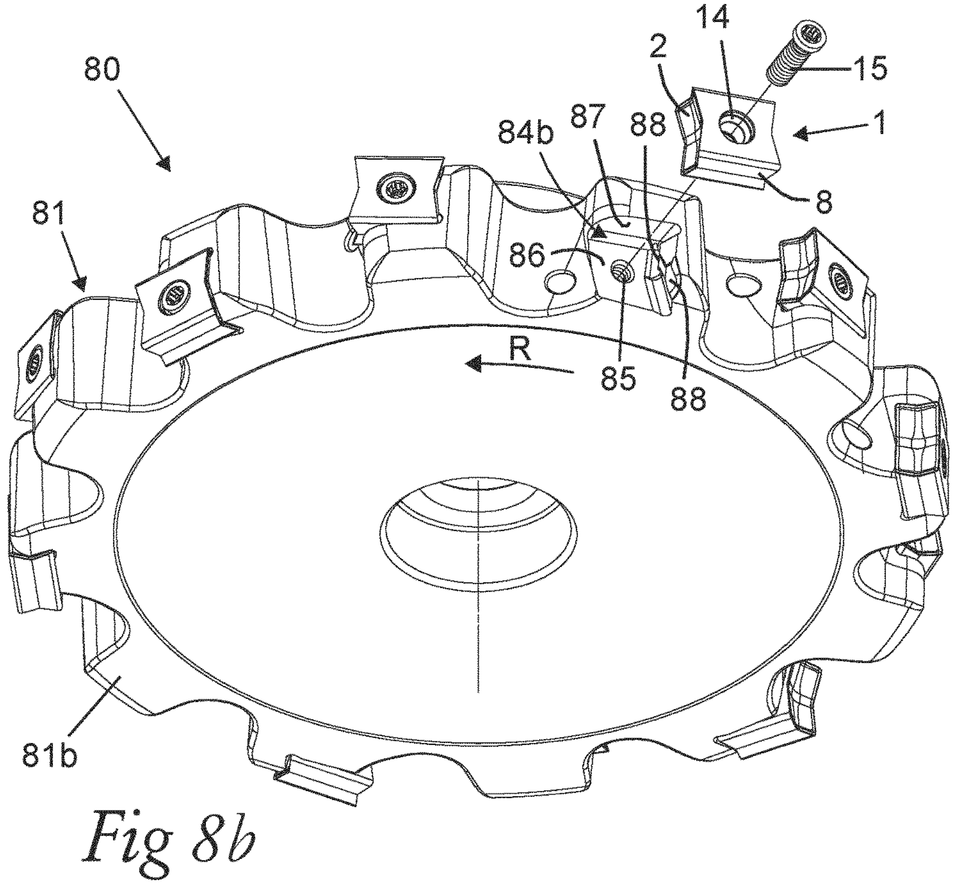
Figure 9A:
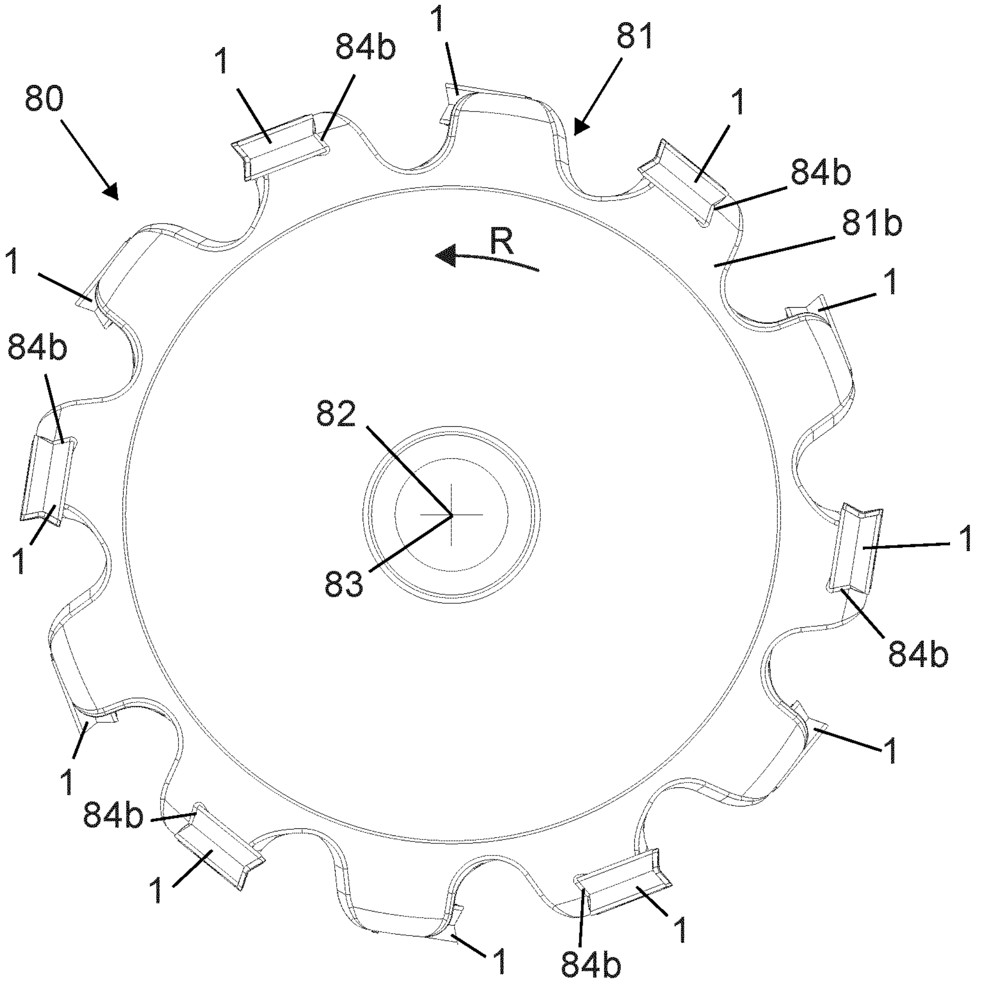
FIGS. 9*a* and 9*b* are planar views from different directions of the milling tool of FIGS. 8*a* and 8*b*.
Figure 9B:
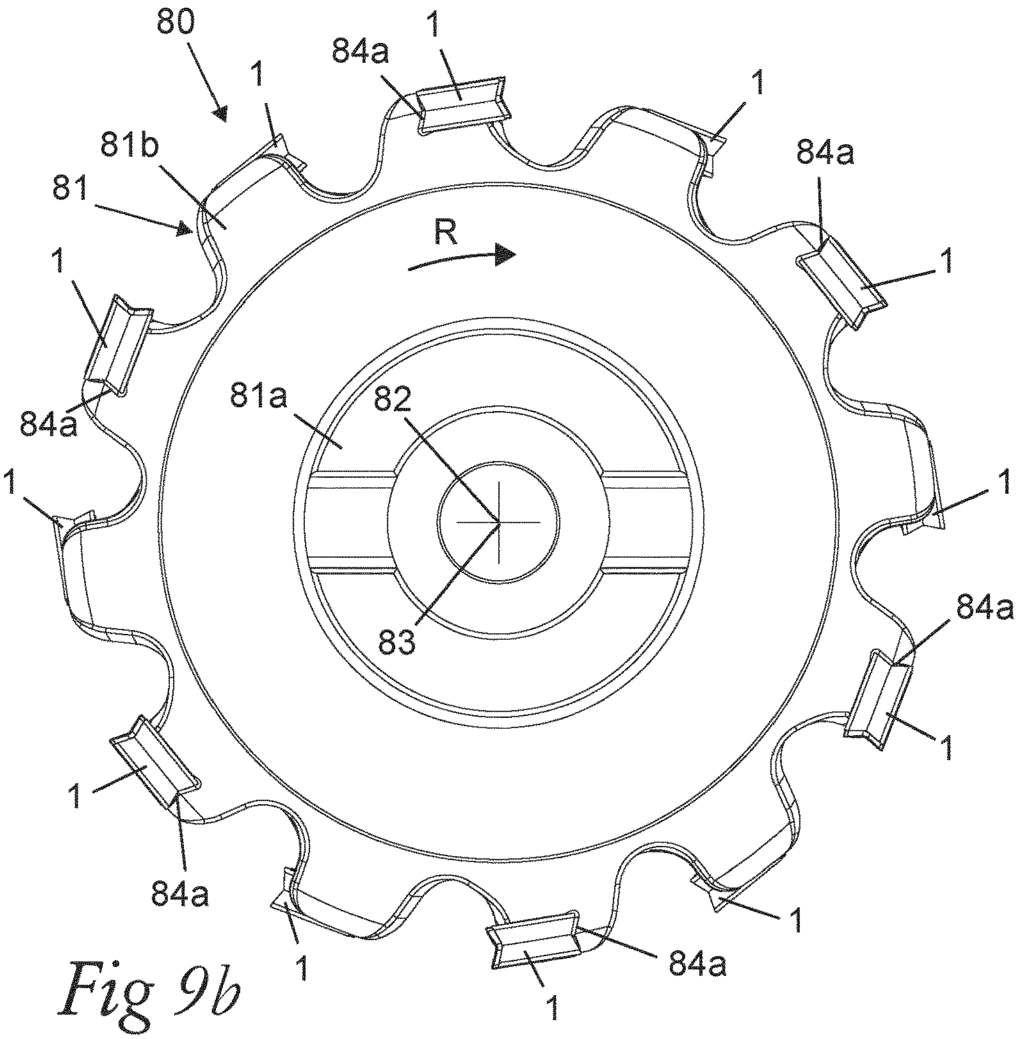
Figure 10:
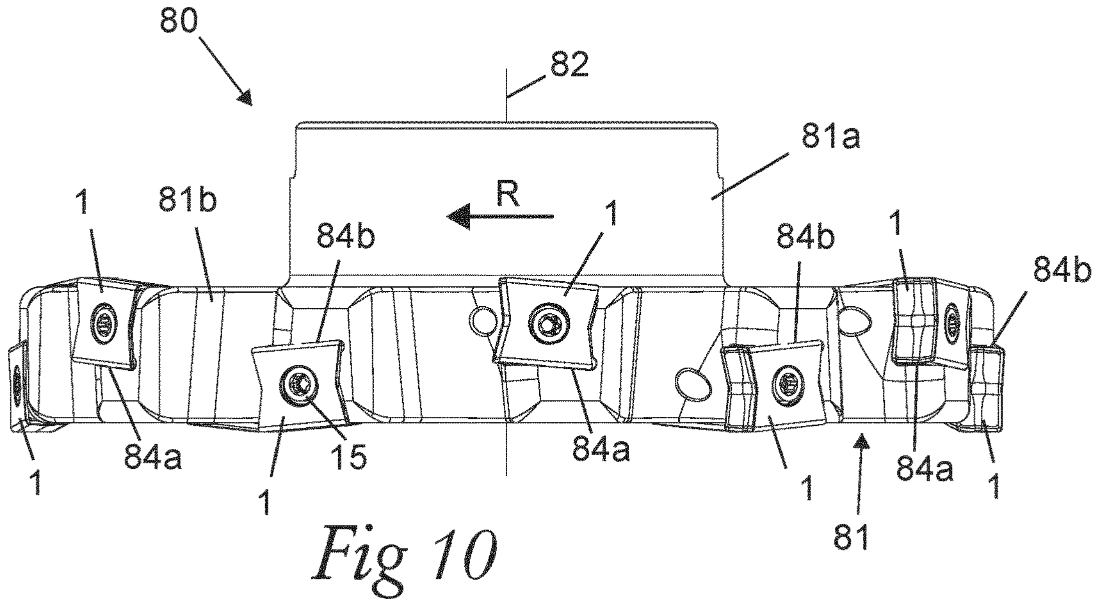
FIG. 10 is a lateral view of the milling tool of FIGS. 8*a* and 8*b*.
Figure 11A:
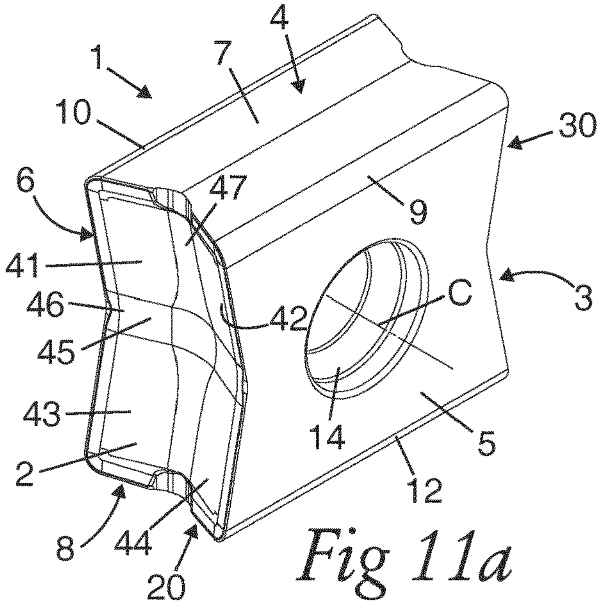
FIG. 11*a* is a perspective view of a cutting insert according to an eighth embodiment of the invention.
Figure 11B:
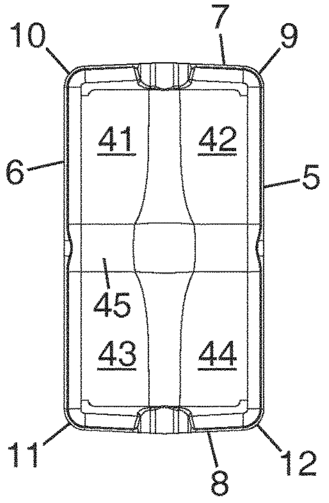
FIG. 11*b* is an end view of the cutting insert of FIG. 11*a*.
Figure 11C:
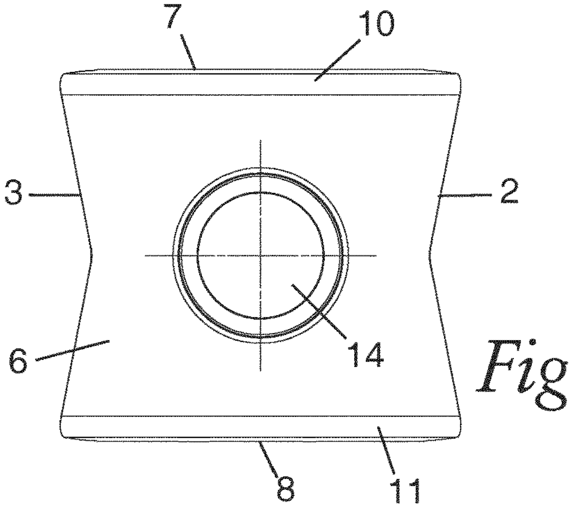
FIG. 11*c* is a lateral view from a major side of the cutting insert of FIG. 11*a*.
Figure 11D:
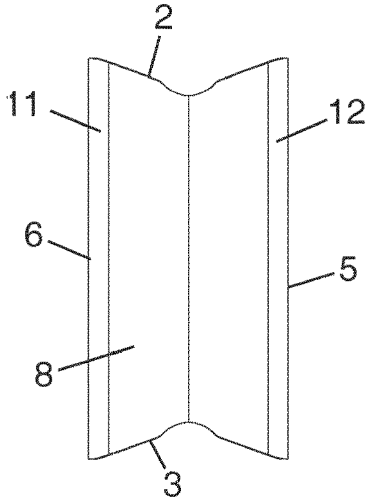
FIG. 11*d* is a lateral view from a minor side of the cutting insert of FIG. 11*a*.
Figure 11E:
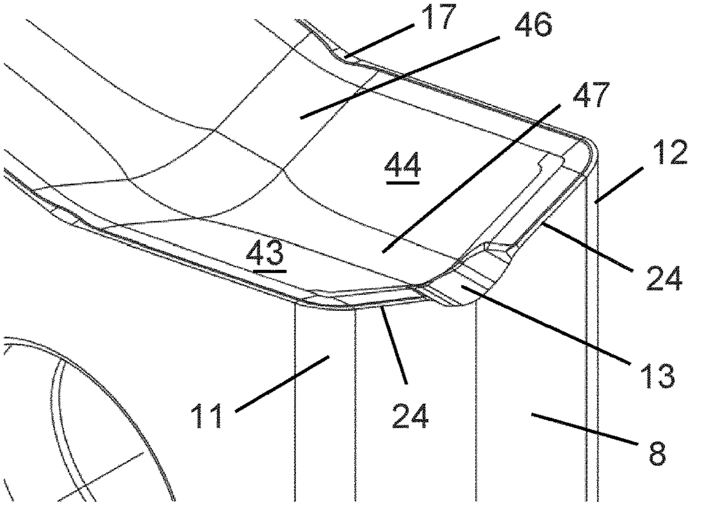
FIG. 11*e* is a perspective close view on a part of the cutting insert of FIG. 11*a*.

FIGS. 8-10 illustrate a milling tool 80 for use in slot or groove milling. The milling tool 80 comprises a tool body 81 and is configured to be rotated about an axis of rotation 82. The tool body 81 has a centre axis 83, which coincides with the axis of rotation 82 of the milling tool 80. A rear part 81*a* of the tool body forms a connection member, through which the tool body 81 is mountable, directly or via an intermediate tool holder, to a rotating spindle or the similar of a milling machine. A disc-shaped part 81*b* of the tool body is provided with insert seats 84*a*, 84*b* configured to receive double-sided tangential cutting inserts 1 of the type described above. In the illustrated example, the tool body 81 is provided with twelve insert seats 84*a*, 84*b* evenly distributed about the centre axis 83 of the tool body. However, the tool body 81 may be provided with any other suitable number of insert seats. In the illustrated example, every second insert 84*a* is arranged on a rear side of the disc-shaped part 81*b* and the other insert seats 84*b* are arranged on an opposite front side of the disc-shaped part 81*b*.

A cutting insert 1 is mounted in each one of the insert seats 84*a*, 84*b* in the tool body 81. Each cutting insert 1 is releasably fixed to the associated insert seat 84*a*, 84*b* by means of a fastening element 15 in the form of a screw, which extends through the through hole 14 in the cutting insert 1 and is engaged in a threaded hole 85 in a radial support surface 86 in the insert seat. The insert seat 84*a*, 84*b* is also provided with an axial support surface 87 and at least one tangential support surface 88. In the illustrated example, the insert seat 84*a*, 84*b* is provided with two tangential support surfaces 88.

Each cutting insert 1 is mountable in four different working positions in each insert seat 84*a*, 84*b*, as described in closer detail below. The cutting inserts 1 could also be mounted in an insert seat (not shown) where the threaded hole 85 for the fastening element 15 is provided in an axial support surface in the insert seat. In that case, an insert seat would be provided in the rear side or in the front side of the disc-shaped part 81*b*.

When a cutting insert 1 is received in an insert seat 84*a* on the rear side of the disc-shaped part 81*b* of the illustrated milling tool 80 with the first end face 2 serving as leading face of the cutting insert, the cutting insert may be mounted in the insert seat 84*a* in two different working positions, wherein:

- a part of the first major side face 5 abuts against the radial support surface 86 in the insert seat 84*a* and a part of the first minor side face 7 abuts against the axial support surface 87 in the insert seat 84*a* when the cutting insert 1 is in a first one of these two working position, wherein a first one 21*a* of the first sets of cutting edges is in an active cutting position; and
- a part of the second major side face 6 abuts against the radial support surface 86 in the insert seat 84*a* and a part of the second minor side face 8 abuts against the axial support surface 87 in the insert seat 84*a* when the cutting insert 1 is in the other one of these two working position, wherein a second one 21*b* of the first sets of cutting edges is in an active cutting position.

In both of these two working positions, parts of two diagonally opposite abutment surfaces 51, 54 on the second end face 3 of the cutting insert 1 abut against a respective one of the two tangential support surfaces 88 in the insert seat 84*a*.

When a cutting insert 1 is received in an insert seat 84*a* on the rear side of the disc-shaped part 81*b* of the illustrated milling tool 80 with the second end face 3 serving as leading face of the cutting insert, the cutting insert may be mounted in the insert seat 84*a* in two different working positions, wherein:

- a part of the first major side face 5 abuts against the radial support surface 86 in the insert seat 84*a* and a part of the second minor side face 8 abuts against the axial support surface 87 in the insert seat 84*a* when the cutting insert 1 is in a first one of these two working position, wherein a first one 31*a* of the second sets of cutting edges is in an active cutting position; and
- a part of the second major side face 6 abuts against the radial support surface 86 in the insert seat 84*a* and part of the first minor side face 7 abuts against the axial support surface 87 in the insert seat 84*a* when the cutting insert 1 is in the other one of these two working position, wherein a second one 31*b* of the second sets of cutting edges is in an active cutting position.

In both of these two working positions, parts of two diagonally opposite abutment surfaces 41, 44 on the first end face 2 of the cutting insert 1 abut against a respective one of the two tangential support surfaces 88 in the insert seat 84*a*.

When a cutting insert 1 is received in an insert seat 84*b* on the front side of the disc-shaped part 81*b* of the illustrated milling tool 80 with the first end face 2 serving as leading face of the cutting insert, the cutting insert may be mounted in the insert seat 84*b* in two different working positions, wherein:

- a part of the first major side face 5 abuts against the radial support surface 86 in the insert seat 84*b* and a part of the second minor side face 8 abuts against the axial support surface 87 in the insert seat 84*b* when the cutting insert 1 is in a first one of these two working position, wherein a third one 21*c* of the first sets of cutting edges is in an active cutting position; and
- a part of the second major side face 6 abuts against the radial support surface 86 in the insert seat 84*b* and a part of the first minor side face 7 abuts against the axial support surface 87 in the insert seat 84*b* when the cutting insert 1 is in the other one of these two working position, wherein a fourth one 21*d* of the first sets of cutting edges is in an active cutting position.

In both of these two working positions, parts of two diagonally opposite abutment surfaces 52, 53 on the second end face 3 of the cutting insert 1 abut against a respective one of the two tangential support surfaces 88 in the insert seat 84*b*.

When a cutting insert 1 is received in an insert seat 84*b* on the front side of the disc-shaped part 81*b* of the illustrated milling tool 80 with the second end face 3 serving as leading face of the cutting insert, the cutting insert may be mounted in the insert seat 84*b* in two different working positions, wherein:

- a part of the first major side face 5 abuts against the radial support surface 86 in the insert seat 84*b* and a part of the first minor side face 7 abuts against the axial support surface 87 in the insert seat 84*b* when the cutting insert 1 is in a first one of these two working position, wherein a third one 31*c* of the second sets of cutting edges is in an active cutting position; and
- a part of the second major side face 6 abuts against the radial support surface 86 in the insert seat 84*b* and part of the second minor side face 8 abuts against the axial support surface 87 in the insert seat 84*b* when the cutting insert 1 is in the other one of these two working position, wherein a fourth one 31*d* of the second sets of cutting edges is in an active cutting position.

In both of these two working positions, parts of two diagonally opposite abutment surfaces 42, 43 on the first end face 2 of the cutting insert 1 abut against a respective one of the two tangential support surfaces 88 in the insert seat 84*b*.

When a cutting insert 1 is received in an insert seat 84*a* on the rear side of the disc-shaped part 81*b* of the illustrated milling tool 80 with the first end face 2 serving as leading face of the cutting insert, in both working positions parts of two diagonally opposite abutment surfaces 51, 54 on the second end face 3 of the cutting insert 1 abut against a respective one of the two tangential support surfaces 88 in the insert seat 84*a*.

When a cutting insert 1 is received in an insert seat 84*b* on the front side of the disc-shaped part 81*b* of the illustrated milling tool 80 with the first end face 2 serving as leading face of the cutting insert, in both working positions parts of two diagonally opposite abutment surfaces 52, 53 on the second end face 3 of the cutting insert 1 abut against a respective one of the two tangential support surfaces 88 in the insert seat 84*b*.

When a cutting insert 1 is received in an insert seat 84*a* on the rear side of the disc-shaped part 81*b* of the illustrated milling tool 80 with the second end face 3 serving as leading face of the cutting insert, in both working positions parts of two diagonally opposite abutment surfaces 41, 44 on the first end face 2 of the cutting insert 1 abut against a respective one of the two tangential support surfaces 88 in the insert seat 84*a*.

When a cutting insert 1 is received in an insert seat 84*b* on the front side of the disc-shaped part 81*b* of the illustrated milling tool 80 with the second end face 3 serving as leading face of the cutting insert, in both working positions parts of two diagonally opposite abutment surfaces 42, 43 on the first end face 2 of the cutting insert 1 abut against a respective one of the two tangential support surfaces 88 in the insert seat 84*b*.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A double-sided tangential cutting insert with eight different working positions, the cutting insert comprising:

- two end faces arranged opposite to each other on opposite sides of the cutting insert, wherein the two end faces are configured to serve as leading and trailing faces of the cutting insert when mounted to a tool body and as seen in an intended direction of rotation of the tool body;
- a peripheral surface extending around the cutting insert between the two end faces, the peripheral surface comprising:
  - two major side faces arranged opposite to each other on opposite sides of the cutting insert;
  - two minor side faces arranged opposite to each other on opposite sides of the cutting insert, each one of the two minor side faces being arranged between the two major side faces; and
  - four corner side faces, each of the four corner side faces being arranged between one major side face and one minor side face;
- a through hole extending through the cutting insert between the two major side faces;
- a first group of cutting edges distributed along a periphery of a first end face of the two end faces and formed at an intersection between the first end face and the peripheral surface;
- a second group of cutting edges distributed along a periphery of a second end face of the two end faces and formed at an intersection between the second end face and the peripheral surface;
- a first group of abutment surfaces-provided on the first end face; and
- a second group of abutment surfaces provided on the second end face, wherein each one of the first and the second group of abutment surfaces includes four plane, or at least substantially plane, abutment surfaces arranged on an associated end face in a grid-like pattern with two first arrays, each of the two first arrays including two consecutive abutment surfaces and extending between the two major side faces, and two second arrays, and each of two second arrays including two consecutive abutment surfaces and extending between the two minor side faces, wherein the four abutment surfaces on each one of the two end faces are separated from each other by a transition area, and wherein each abutment surface in each one of the first and the second group of abutment surfaces is inclined inwards in the cutting insert, as seen in a direction from a first edge of the abutment surface facing the adjacent major side face towards an opposite second edge of the abutment surface facing the other abutment surface in a same first array and also inclined inwards in the cutting insert as seen in a direction from a third edge of the abutment surface facing the adjacent minor side face towards an opposite fourth edge of the abutment surface facing the other abutment surface in the same second array, such that each two consecutive abutment surfaces in each array of the two first arrays are inclined towards each other and such that each two consecutive abutment surfaces in each array of the two second arrays are inclined towards each other.

2. The double-sided tangential cutting insert according to claim 1, wherein the two minor side faces are parallel with each other as seen in cross-sectional planes through the cutting insert perpendicularly to a centre axis of the through hole, wherein an imaginary projection plane that contains the centre axis of the through hole extends perpendicularly to the two minor side faces, wherein an orthographic parallel projection of the four abutment surfaces (41-44) in the first group of abutment surfaces onto the projection plane has a total projected area $A_{A1}$, wherein an orthographic parallel projection of the four abutment surfaces in the second group of abutment surfaces onto the projection plane has a total projected area $A_{A2}$, wherein an orthographic parallel projection of the transition area between the four abutment surfaces in the first group of abutment surfaces onto the projection plane has a projected area $A_{T1}$, wherein an orthographic parallel projection of the transition area between the four abutment surfaces in the second group of abutment surfaces onto the projection plane has a projected area $A_{T2}$, and wherein each one of the quotients $A_{T1}/A_{A1}$ and $A_{T2}/A_{A2}$ is smaller than or equal to 1.

3. The double-sided tangential cutting insert according to claim 1, wherein the two minor side faces are parallel with each other as seen in cross-sectional planes through the cutting insert perpendicularly to a centre axis of the through hole, wherein at least a part of each one of the four abutment surfaces on each one of the two end faces is located at a longer distance from an imaginary reference plane that contains the centre axis of the through hole and extends perpendicularly to the two minor side faces than each part of the transition area on the same end face.

4. The double-sided tangential cutting insert according to claim 1, wherein the transition area on each one of the two end faces has a concave cross-sectional shape.

5. The double-sided tangential cutting insert according to claim 4, wherein the transition area on each one of the two end faces is formed by a first groove extending on the associated end face between the two first arrays of abutment surfaces and an intersecting second groove extending on the associated end face between the two second arrays of abutment surfaces.

6. The double-sided tangential cutting insert according to claim 4, wherein the transition area on each one of the two end faces is formed by a first smooth concave transition, which is tangentially connected to each of the four abutment surfaces, and an intersecting second smooth concave transition, which is also tangentially connected to each of the four abutment surfaces (41-44; 51-54).

7. The double-sided tangential cutting insert according to claim 1, wherein the first end face is divided into four sections by an imaginary first dividing plane, which extends between and separates the two first arrays of abutment surfaces on the first end face, and an imaginary second dividing plane, which is transversal to the first dividing plane and extends between and separates the two second arrays of abutment surfaces on the first end face, and wherein the two end faces have 180° rotational symmetry with each other with respect to a centre axis of the through hole, or the two end faces are mirror symmetrical to each other with respect to a symmetry plane that contains the centre axis of the through hole and extends halfway between the two end faces.

8. The double-sided tangential cutting insert according to claim 7, wherein the transition area between the two first arrays of abutment surfaces on the first end face extends along the first dividing plane, and wherein the transition area between the two second arrays of abutment surfaces on the first end face extends along the second dividing plane.

9. The double-sided tangential cutting insert according to claim 7, wherein the first dividing plane contains the centre axis of the through hole.

10. The double-sided tangential cutting insert according to claim 7, wherein the two minor side faces are parallel with each other as seen in cross-sectional planes through the cutting insert perpendicularly to the centre axis of the through hole, and wherein the first dividing plane extends halfway between the two minor side faces.

11. The double-sided tangential cutting insert according to claim 7, wherein the second dividing plane is perpendicular to the first dividing plane.

12. The double-sided tangential cutting insert according to claim 11, wherein the second dividing plane extends halfway between the two major side faces, wherein the two major side faces are parallel with each other.

13. The double-sided tangential cutting insert according to claim 1, wherein the two major side faces are parallel with each other, wherein an imaginary median plane extends halfway between the two major side faces in parallel with the two major side faces, and wherein each one of the two end faces has 180° rotational symmetry about an imaginary reference axis that is parallel with a first line of intersection between the median plane and a first one of the two minor side faces and with a second line of intersection between the median plane and the other one of the two minor side faces and that extends in the median plane and halfway between the first line of intersection and the second line of intersection.

14. The double-sided tangential cutting insert according to claim 1, wherein the two minor side faces have 180° rotational symmetry with each other with respect to the centre axis of the through hole.

15. The double-sided tangential cutting insert according to claim 1, wherein the two end faces have 180° rotational symmetry with each other with respect to a centre axis of the through hole.

16. The double-sided tangential cutting insert according to claim 1, wherein each abutment surface in said first and second groups of abutment surfaces forms an angle of 50-89° with the adjacent major side face.

17. The double-sided tangential cutting insert according to claim 1, wherein each abutment surface in said first and second groups of abutment surfaces forms an angle of 60-89°, with the adjacent minor side face.

18. The double-sided tangential cutting insert according to claim 1, wherein rake surfaces are provided on the first end face between each one of the cutting edges in the first group of cutting edges and the adjacent abutment surface in the first group of abutment surfaces, and wherein rake surfaces are provided on the second end face between each one of the cutting edges in the second group of cutting edges and the adjacent abutment surface in the second group of abutment surfaces.

19. The double-sided tangential cutting insert according to claim 1, wherein the two major side faces are parallel with each other and/or that the two major side faces are plane, or at least substantially plane.

20. The double-sided tangential cutting insert according to claim 1, wherein the first group of cutting edges includes four first sets of cutting edges, wherein each first set of cutting edges includes a primary cutting edge formed at an intersection between the first end face and one of the two major side faces, a corner cutting edge formed at an intersection between the first end face and one of the four corner side faces and a secondary cutting edge formed at an intersection between the first end face and one of the two minor side faces, and wherein the primary cutting edge, the corner cutting edge and the secondary cutting edge of each one of the first sets of cutting edges are located in series with each other with the corner cutting edge located between the primary cutting edge and the secondary cutting edge, and wherein the second group of cutting edges includes four second sets of cutting edges, wherein each second set of cutting edges includes a primary cutting edge formed at an intersection between the second end face and one of the two major side faces, a corner cutting edge formed at an intersection between the second end face and one of the four corner side faces and a secondary cutting edge formed at an intersection between the second end face and one of the two minor side faces, and wherein the primary cutting edge, the corner cutting edge and the secondary cutting edge of each one of the second sets of cutting edges are located in series with each other with the corner cutting edge located between the primary cutting edge and the secondary cutting edge.

21. A tool comprising:

a tool body; and a double-sided tangential cutting insert according to claim 1 mounted in an insert seat of the tool body.

* * * * *